(12) United States Patent
Wohlwend et al.

(10) Patent No.: US 9,002,736 B2
(45) Date of Patent: *Apr. 7, 2015

(54) SYSTEM AND METHOD FOR SUPPORTING MOBILE UNIT CONNECTIVITY FOR COMPUTER SERVER TO PROCESS SPECIFIC ORDERS

(71) Applicants: Jeffrey L. Wohlwend, Plano, TX (US); Peter J. Walsh, Jr., Flower Mound, TX (US)

(72) Inventors: Jeffrey L. Wohlwend, Plano, TX (US); Peter J. Walsh, Jr., Flower Mound, TX (US)

( * ) Notice: Subject to any disclaimer, the term of this patent is extended or adjusted under 35 U.S.C. 154(b) by 30 days.

This patent is subject to a terminal disclaimer.

(21) Appl. No.: 14/055,641

(22) Filed: Oct. 16, 2013

(65) Prior Publication Data

US 2014/0046798 A1 Feb. 13, 2014

Related U.S. Application Data

(63) Continuation of application No. 13/092,594, filed on Apr. 22, 2011, now Pat. No. 8,565,735.

(60) Provisional application No. 61/408,486, filed on Oct. 29, 2010.

(51) Int. Cl.
| | |
|---|---|
| *H04W 4/02* | (2009.01) |
| *G06Q 30/06* | (2012.01) |
| *G11B 5/66* | (2006.01) |
| *G06Q 30/02* | (2012.01) |
| *G06Q 10/08* | (2012.01) |

(52) U.S. Cl.
CPC ................ *G11B 5/66* (2013.01); *H04W 4/021* (2013.01); *G06Q 30/0261* (2013.01); *G06Q 30/0617* (2013.01); *G06Q 10/083* (2013.01); *G06Q 30/0635* (2013.01)

(58) Field of Classification Search
CPC .......... H04N 7/18; G06F 17/30; G06Q 30/06; H04W 4/02
See application file for complete search history.

(56) References Cited

U.S. PATENT DOCUMENTS

| | | | |
|---|---|---|---|
| 7,013,110 | B1 | 3/2006 | Carpenter et al. |
| 7,038,973 | B1 | 5/2006 | Merlino |
| 7,149,549 | B1 | 12/2006 | Ortiz et al. |
| 7,180,427 | B2 | 2/2007 | Meyer et al. |
| 7,212,983 | B2 | 5/2007 | Redmann et al. |
| 7,376,388 | B2 | 5/2008 | Ortiz et al. |
| 7,620,426 | B2 | 11/2009 | Ortiz et al. |
| 7,657,920 | B2 | 2/2010 | Arseneau et al. |
| 7,782,363 | B2 | 8/2010 | Ortiz |
| 7,796,162 | B2 | 9/2010 | Ortiz |
| 7,812,856 | B2 | 10/2010 | Ortiz et al. |

(Continued)

*Primary Examiner* — Myron K Wyche
(74) *Attorney, Agent, or Firm* — D. Scott Hemingway; Hemingway & Hansen, LLP

(57) ABSTRACT

The present invention is an applications gateway that offers multiple functions and features for specific geographic venue locations, while providing easy access to advertising, purchasing, and redemption opportunities for that specific geographic venue location. Venue locations can be stadiums, shopping malls, amusement parks, open air spaces where people can congregate, and/or buildings, which most often require the presence of a concentration of people. The venue location may correlate to the location of the hand-held mobile unit or it may be a remote geographic venue location not near the location of the hand-held mobile unit. Access to the gateway application is through a hand-held mobile unit, which can include a mobile phone, smartphone device, or portable computer having a wireless radio transmission connection. (e.g. iPhone, Droid, iPad, Slate, etc.).

26 Claims, 25 Drawing Sheets

(56) References Cited

U.S. PATENT DOCUMENTS

| | | |
|---|---|---|
| 7,826,877 B2 | 11/2010 | Ortiz et al. |
| 8,565,735 B2 * | 10/2013 | Wohlwend et al. ........ 455/414.1 |
| 2002/0042743 A1 | 4/2002 | Ortiz et al. |
| 2002/0108125 A1 | 8/2002 | Joao |
| 2003/0014275 A1 | 1/2003 | Bearden, III et al. |
| 2003/0040303 A1 | 2/2003 | Nelson et al. |
| 2006/0095331 A1 | 5/2006 | O'Malley et al. |
| 2007/0021058 A1 | 1/2007 | Arseneau et al. |
| 2007/0022438 A1 | 1/2007 | Arseneau et al. |
| 2007/0022446 A1 | 1/2007 | Arseneau et al. |
| 2007/0058041 A1 | 3/2007 | Arseneau et al. |
| 2007/0121534 A1 | 5/2007 | James et al. |
| 2007/0188612 A1 | 8/2007 | Carter |
| 2007/0240190 A1 | 10/2007 | Arseneau et al. |
| 2008/0016534 A1 | 1/2008 | Ortiz et al. |
| 2008/0065768 A1 | 3/2008 | Ortiz et al. |
| 2008/0207137 A1 | 8/2008 | Maharajh et al. |
| 2009/0128631 A1 | 5/2009 | Ortiz |
| 2009/0237505 A1 | 9/2009 | Ortiz et al. |
| 2010/0080163 A1 | 4/2010 | Krishnamoorthi et al. |
| 2010/0121567 A1 | 5/2010 | Mendelson |
| 2010/0284391 A1 | 11/2010 | Ortiz et al. |
| 2010/0289900 A1 | 11/2010 | Ortiz |
| 2011/0184945 A1 | 7/2011 | Das et al. |

* cited by examiner

SYSTEM AND METHOD FOR SUPPORTING MOBILE UNIT CONNECTIVITY FOR COMPUTER SERVER TO PROCESS SPECIFIC ORDERS

RELATED APPLICATION DATA

This application is a continuation of U.S. application Ser. No. 13/092,594, filed Apr. 22, 2011, which claims benefit of U.S. Provisional Application No. 61/408,486, filed Oct. 29, 2010. The Provisional patent application is also incorporated by reference into this patent application.

TECHNICAL FIELD OF THE INVENTION

The technical field of this invention relates to connectivity of one or more mobile units with associated with a specific venue.

BACKGROUND OF THE INVENTION

Hand held computing devices (i.e., hereinafter referred to as "hand held devices" or "handheld devices") are very popular for storing and maintaining information. Although PDAs may be connected to a desktop personal computer or other PDAs via infrared, direct wire, or wireless communication links, PDAs and similar hand held devices, can be linked to remote networks, such as the Internet, or local wireless resources, such as RF broadcasts, through available wireless communications techniques.

The most advanced data- and video-enabled wireless communication devices currently available in the marketplace take the form of a PDA (e.g., iPhone, Windows CE compatible hand held computers, Android, and hand-held gaming devices). Unlike personal computers, which are general-purpose devices geared toward refining and processing information, PDAs are designed to capture, store and display information originating from various sources. Additionally, while a certain level of skill is required to use a personal computer effectively, PDAs are designed with the novice and non-computer user in mind.

Attempts have been made to provide venue-based, interactive entertainment to enhance the fan experience at live events. Such attempts utilize touch-screen technology integrated directly into seats at outdoor or indoor arenas. Audience members, however, due to their integration with the viewer seat, can easily damage such devices. Systems that incorporate such devices are also expensive because they literally require miles of cable. The present invention attempts to solve these problems through the use of wireless hand held devices and the Internet.

The Internet, like so many other high tech developments, grew from research originally performed by the United States Department of Defense. In the 1960s, the military had accumulated a large collection of incompatible computer networks. Because of their incompatible data structures and transmission protocols, many of these computers could not communicate with other computers across network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device. Because standard protocols are used in Internet communications, the IP protocol on the destination communication device decodes the transmitted information into the original information transmitted by the originating device.

TCP/IP Addressing and Routing

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network.

A router, agent or gateway is used to regulate the transmission of information packets into and out of the computer network. Routers interpret the logical address contained in information packet headers and direct the information packets to the intended destination. Information packets addressed between computers on the same network do not pass through the router to the greater network, and as such, these information packets will not clutter the transmission lines of the greater network. If data is addressed to a computer outside the network, the router forwards the data onto the greater network.

The Internet protocols were originally developed with an assumption that Internet users would be connected to a single, fixed network. With the advent of cellular wireless communication systems, such as mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a Mobile Node. Typically, a Mobile Node maintains connectivity to its home network through a foreign network. The Mobile Node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

BRIEF DESCRIPTION OF THE DRAWINGS

The objects and features of the invention will become more readily understood from the following detailed description and appended claims when read in conjunction with the accompanying drawings in which like numerals represent like elements and in which:

SUMMARY OF THE INVENTION

The present invention is an applications gateway that offers multiple functions and features for specific geographic venue locations, while providing easy access to advertising, purchasing, and redemption opportunities for that specific geographic venue location. Venue locations can be stadiums, shopping malls, amusement parks, or buildings, which most often requires the presence of a concentration of people.

The venue location may correlate to the location of the hand-held mobile unit, locations at or near a stadium, mall, park, or other location, or it may be a remote geographic venue location not near the location of the hand-held mobile unit. Access to the gateway application is through a hand-held mobile unit, which can include a mobile phone, smartphone device, or portable computer having a wireless radio transmission connection at the above-identified venue location. (e.g. iPhone, Droid, iPad, Slate, etc.)

The present invention supports the download of the applications program from a dedicated server, or from other sources such as iTunes, Android store, Blackberry store, carrier websites. After downloaded and initiated, venues are offered by the system to the user mobile unit, which selects a venue or sport or other option. Once a venue or sport is selected, the application connects the user to a venue system controller (home agent) and computer server, which provides the user with many different options for data transmission delivery or order requests.

Certain embodiments of the present invention allow the device's wireless (such as WiFi) connection to activate a push message that will activate the device and notify the user of a particular event or redemption opportunity. (e.g.: Cowboys Stadium will offer $1 discount on Pepsi purchase during 3rd quarter of game). Updates on other sporting events or news reports (news breaks) will also be supported by the "push" functionality. Advertising is optional, and the functions in the gateway application are flexible and interchangeable based on specifications set by or for the venue location.

DETAILED DESCRIPTION OF THE PREFERRED EMBODIMENTS

Figure 1:
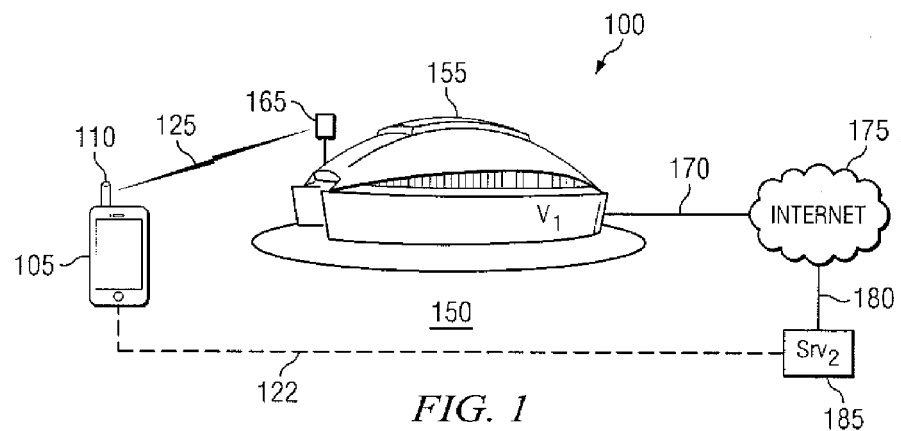
FIGS. 1, 2a and 2b are block diagrams showing system components used with the present invention.

As shown in FIG. 1, the present invention supports a system and method for providing connectivity of a mobile node 105 to one or more sources of information associated with a venue or event so as to provide variable selected information and media transmissions to the mobile node. The mobile node 100 includes a hand-held mobile unit 105 that includes a processor, memory and a power source, as well as a transceiver and antenna 110. The transceiver and antenna 110 supports radio transmission communications 125 to radio transceiver antenna(s) 165 coupled associated with a venue 155 or coupled to a telecommunications system that supports connectivity to the Internet 175 or another network without interfacing directly with equipment components located at venue 150.

The radio transceiver antenna(s) 165 may be coupled to the Internet 175 via a connection 170, and the Internet 175 may be coupled to one or more servers SRV2 185 via connection 180. The mobile hand-held unit 105 may also be connected to SRV2 185 via a separate connection 122, which can include a wireless radio connection or a wireline communication system connection. The server SRV2 185 is capable of maintaining the webpages that support the applications program download for the present invention, as well as supporting the interaction of communications with the mobile node after launch of the applications program and selection of the activity, venue, sport or team requested by the hand-held mobile node 105.

An applications program is downloaded to the hand-held mobile unit that supports an interface with an applications gateway, and the mobile unit will have access to multiple functions and features for specific geographic venue locations through that gateway, all while providing easy access to advertising, purchasing, and redemption opportunities for that specific geographic venue location. Venue locations can be stadiums, shopping malls, amusement parks, or buildings, which most often requires the presence of a concentration of people.

The venue location may correlate to the location of the hand-held mobile unit, locations at or near a stadium, mall, park or other location, or it may be a remote geographic venue location not near the location of the hand-held mobile unit. Access to the gateway application is through a hand-held mobile unit, which can include a mobile phone, smartphone device, or portable computer having a wireless radio transmission connection at the above-identified venue location. (e.g. iPhone, Droid, iPad, Slate, etc.)

The gateway application is programmed in an application software that can be/is utilized by the hand held or portable devices in whatever programming language the said device utilizes to operate the gateway application and then utilizes the wireless communication networks(s) available to that device in that area or any other area where the gateway application can operate in using the functions and/or features of said gateway application.

Figure 2A:
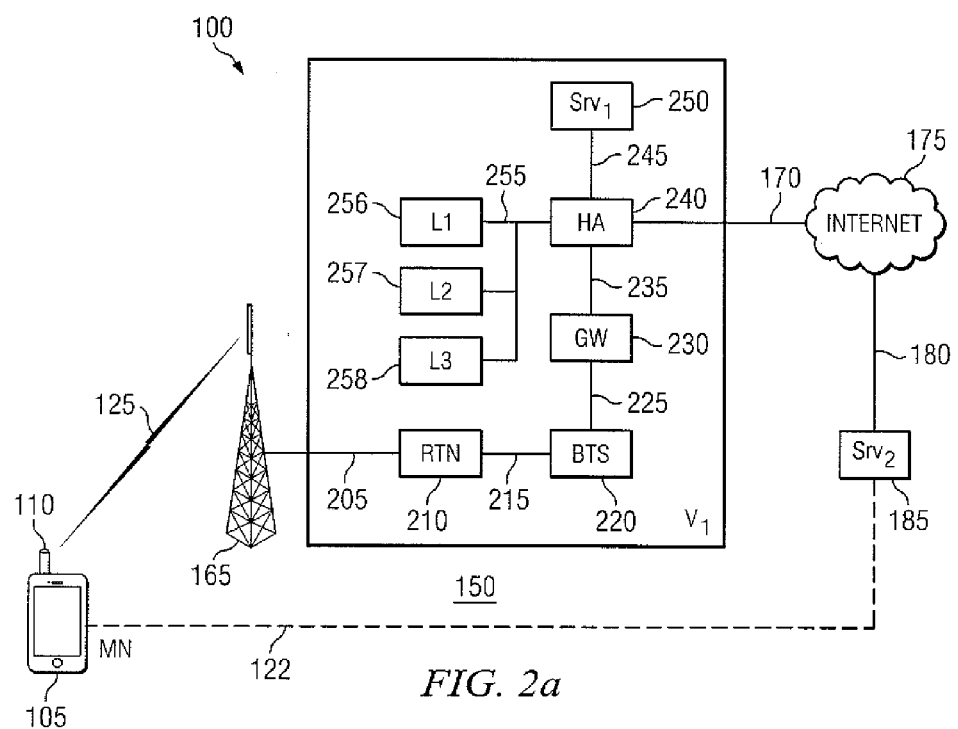

FIG. 2a provides a more detailed explanation of the system components available at the venue 150. The mobile node 100 includes a hand-held mobile unit 105 that includes a processor, memory and a power source, as well as a transceiver and antenna 110. The transceiver and antenna 110 supports radio transmission communications 125 (e.g. WiFi, cellular, GSM, Evdo, 4G/LTE, CDMA, or others) to an radio transceiver antenna 165, which is coupled via connection 205 to a radio transmission network 210 associated with a venue 155. It is also possible for the mobile hand-held unit 105 to be coupled to the radio transceiver antenna 165 and a radio transmission network that is coupled to a telecommunications system that supports connectivity to the Internet 175 or another system network without interfacing directly with equipment or components at venue 150.

The radio transmission network 210 is coupled to a base station transceiver unit 220 via connection 215, where the base station transceiver station provides an interface between radio domain communications and data communications carried over a telecommunications or network computer system. The base station transceiver unit 220 is coupled to a gateway 230 for the network at the venue 150 via connection 225, which provides an interface with the network maintained at the venue 150 or associated with the venue 150. By associated with the venue 150, the invention contemplates centrally located servers or computer network that maintain or provide access to information related to the venue 150, but not located at venue 150. The gateway 230 is coupled to a home agent 240 via connection 235, where the home agent 240 controls communication flow and directions on the network maintained at the venue 150 or associated with the venue 150.

The home agent 240 is coupled to a computer server SRV1 250 via connection 245, which maintains past historical and present real-time information, video feeds or other data that the hand-held user may request. The home agent is also coupled via connection 255 to various locations L1 256, L2 257, and L3 258 at venue 150 so that requests for information hand-held mobile unit 105 user or orders placed by the hand-held mobile unit 105 user can be processed at the proper location at the venue 150. These requests for information may be requests for video feeds from particular camera locations at the venue 150, news reports from particular sources at the venue 150, or other information, data or video feeds provided from available locations at venue 150. (e.g. Bench Cam, Outfield Cam, End-Zone Cam, Cheerleader Cam, etc.) Also, orders placed by the hand-held 105 user can include food orders, merchandise orders, or special requests to specific locations at the venue, such as seat reservations for future games, suite reservations.

The home agent 240 is coupled to the Internet 175 via a connection 170, and the Internet 175 may be coupled to one or more servers SRV2 185 via connection 180. The mobile hand-held unit 105 may also be connected to SRV2 185 via a separate connection 122, which can include a wireless radio connection or a wireline communication system connection. The server SRV2 185 is capable of maintaining the webpages that support the applications program download for the present invention, as well as supporting the interaction of communications with the mobile node after launch of the applications program and selection of the activity, venue, sport or team requested by the hand-held mobile node 105.

Figure 2B:
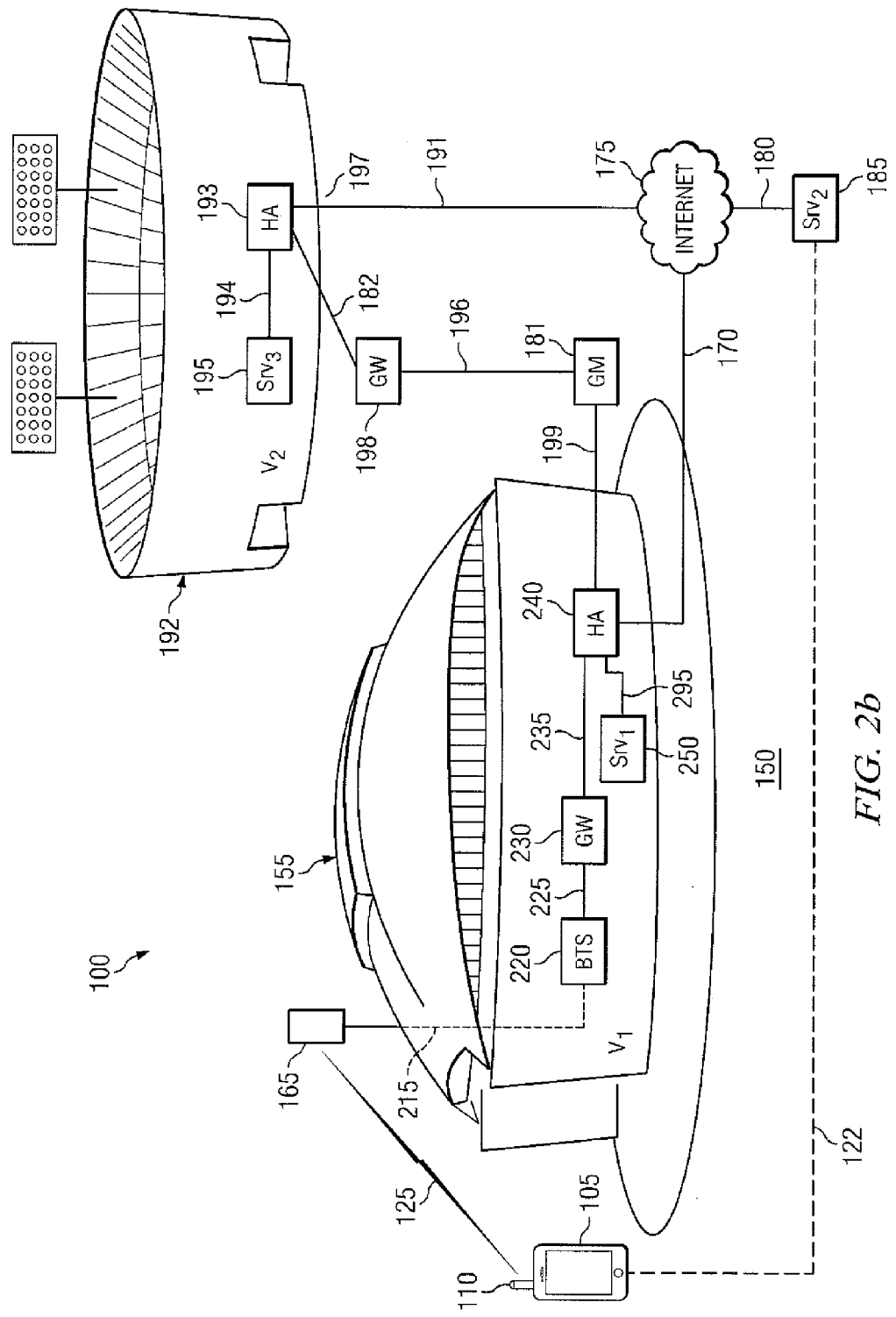

FIG. 2b provides a more detailed explanation of the system components available at the venue 150 and a second venue 192. The mobile node 100 includes a hand-held mobile unit 105 that includes a processor, memory and a power source, as well as a transceiver and antenna 110. The transceiver and antenna 110 supports radio transmission communications 125 to an radio transceiver antenna 165, which is coupled via connection 205 to a radio transmission network 210 associated with a venue 155. It is also possible for the mobile hand-held unit 105 to be coupled to the radio transceiver antenna 165 and a radio transmission network that is coupled to a telecommunications system that supports connectivity to the Internet 175 or another system network without interfacing directly with equipment or components at venue 150.

The transceiver antenna 165 and the radio transmission network 210 are coupled to a base station transceiver unit 220 via connection 215, where the base station transceiver station provides an interface between radio domain communications and data communications carried over a telecommunications or network computer system. The base station transceiver unit 220 is coupled to a gateway 230 for the network at the venue 150 via connection 225, which provides an interface with the network maintained at the venue 150 or associated with the venue 150. The gateway 230 is coupled to a home agent 240 via connection 235, where the home agent 240 controls communication flow and directions on the network maintained at the venue 150 or associated with the venue 150.

The home agent 240 is coupled to a computer server SRV1 250 via connection 245, which maintains past historical and present real-time information, video feeds or other data that the hand-held user may request. The home agent is also coupled via connection 255 to various locations L1 256, L2 257, and L3 258 at venue 150 so that requests for information hand-held mobile unit 105 user or orders placed by the hand-held mobile unit 105 user can be processed at the proper location at the venue 150. These requests for information may be requests for video feeds from particular camera locations at the venue 150, news reports from particular sources at the venue 150, or other information, data or video feeds provided from available locations at venue 150. (e.g. Bench Cam, Outfield Cam, End-Zone Cam, Cheerleader Cam, etc.) Also, orders placed by the hand-held 105 user can include food orders, merchandise orders, or special requests to specific locations at the venue, such as seat reservations for future games, suite reservations.

The home agent 240 is coupled to the Internet 175 via a connection 170, and the Internet 175 may be coupled to one or more servers SRV2 185 via connection 180. The mobile hand-held unit 105 may also be connected to SRV2 185 via a separate connection 122, which can include a wireless radio connection or a wireline communication system connection. The server SRV2 185 is capable of maintaining the webpages that support the applications program download for the present invention, as well as supporting the interaction of communications with the mobile node after launch of the applications program and selection of the activity, venue, sport or team requested by the hand-held mobile node 105.

The home agent 240 is coupled to the Internet 175 by connection 170, and this connection may allow a communication path to a second venue 192 or a computer network associated with a second venue 192. Namely, the Internet 175 may be connected to a home agent 193 at the second venue 192 via connection 191. The home agent 193 may be connected to a server computer SRV3 195 via connection 194, where the server computer SRV3 is capable. The server SRV3 195 is capable of maintaining the webpages that support the applications program download for the present invention, as well as supporting the interaction of communications with the mobile node after launch of the applications program and selection of the activity, venue, sport or team requested by the hand-held mobile node 105.

The home agent 240 from venue 150 and the home agent 193 from venue 192 may also be coupled by a fiber connection or another telecommunications connection. The home agent 240 is coupled to a gateway 181 through connection 199. The gateway 181 is an interface from the venue 150 computer network to the communication path 196 which is coupled to a gateway 198 at venue 192. The gateway is coupled to the home agent 193 via connection 182. The gateway at or near venue 192 provides an interface between the communications path 196 and the computer network at venue 192. The communication path 196 can be a fiber connection or another comparable high-speed data connection.

In this manner, a person attending an event at venue 150 (or proximately located to venue 150) can access selected data or video feeds from the computer system at a second venue 192. This would allow a Dallas resident to attend a Cowboys football game in Arlington, Tex. and receive a remote video feed from a user-selected camera or other source at a Washington Redskins game being played at a second venue 192. Or, a basketball fan at or near venue 150 could receive a remote video feed from a football game being played at a remote venue 192 location. If venue 150 is a shopping mall, the hand-held device can access a network at venue 150 and watch selected video feeds from a sporting event being played at venue 192. Or, if venue 192 is a second shopping mall, the hand-hale device can acquire data about that second shopping mall venue 192 while located at or near the shopping mall venue 150.

From the above, the present invention has is a communication system supporting the processing communications from a mobile unit comprising a home agent network associated with a first venue and having a home agent coupled to a computer server, said home agent processing communications received from said mobile unit, a transceiver unit coupled to said home agent for receiving and transmitting communications to said mobile unit, and said home agent processes communications from said mobile unit including selected venue-specific requests for information and data relating to said first venue or venue-specific ordering information relating to said first venue.

The communication system identified above uses venue-specific requests for information and data such as specific camera feeds from predetermined camera locations at the first venue, requests for replays of a particular video feeds, requests for video feeds from a broadcast from the first venue, requests for shopping mall map information, requests for shopping mall store or restaurant locations, and venue-specific ordering information is a food order.

Put another way, the present invention is a communication system supporting the processing of communication from a mobile unit, comprising a home network associated with a first venue having a first home agent, said first home agent processing communications received from said mobile unit including requests for venue specific information and data relating to a second venue, a transceiver unit coupled to said first home agent for receiving and transmitting communications to said mobile unit, and a second network associated with said second venue having a second home agent, said second home agent being coupled to said first home agent allowing the second home agent to process venue-specific requests for information and data relating to the second venue or venue-specific ordering information.

The communication system identified above uses venue-specific requests for information and data such as specific camera feeds from predetermined camera locations at the first venue, requests for replays of a particular video feeds, requests for video feeds from a broadcast from the first venue, requests for shopping mall map information, requests for shopping mall store or restaurant locations, and venue-specific ordering information is a food order.

Moreover, the present invention includes a method for processing communication transmissions from a mobile unit, comprising the steps of providing a first home network associated with a first venue, said first home network has a first home agent and a coupled computer server, receiving a communication transmission from a mobile node on a transceiver unit at the first venue, transmitting the received communication from the transceiver unit to the first home agent, and processing communications at the first home agent received from the mobile unit including requests for venue-specific information and data relating to said first venue or venue-specific ordering information relating to said first venue. The method may also include the steps of providing a second home network associated with a second venue, said second home network having a second home agent coupled to said first home agent; transmitting the communication received by the first home agent to the second home agent if it relates to the second venue, and, processing communications received by the second home agent as forwarded from the first home agent including requests for venue specific information and data relating to said second venue or venue-specific ordering information relating to said second venue.

Two applications program types can be operated on the system—one program is specific to the venue and would be branded as such, while the second program would provide a gateway to all venues supporting computer servers and networks coupled to the system. This second type of program would list all the venues available for selection by the hand-held mobile unit, and upon selection the system would couple the mobile unit to the chosen venue network and system.

Specific embodiments will be discussed with respect to FIGS. 3 to 14, but each of these embodiments support a WiFi connection (or similar connection) that allow the pushing of data onto the hand-held mobile device. By "pushing," the invention will use the device's WiFi or cellular connection to activate a push message that will activate the device and notify the user of a particular event or redemption opportunity. (e.g.: Cowboys Stadium will offer $1 discount on Pepsi purchase during 3rd quarter of game). Advertising is optional, and the functions in the gateway application are flexible and interchangeable based on specifications set by or for the venue location. As an example of one category selection, the category of Fantasy Football could be chosen by a user. If that function is chosen, multiple vendors such a CBS, ESPN, etc.

could be linked to the hand-held mobile unit to provide that screen in any particular format.

Figure 3A:
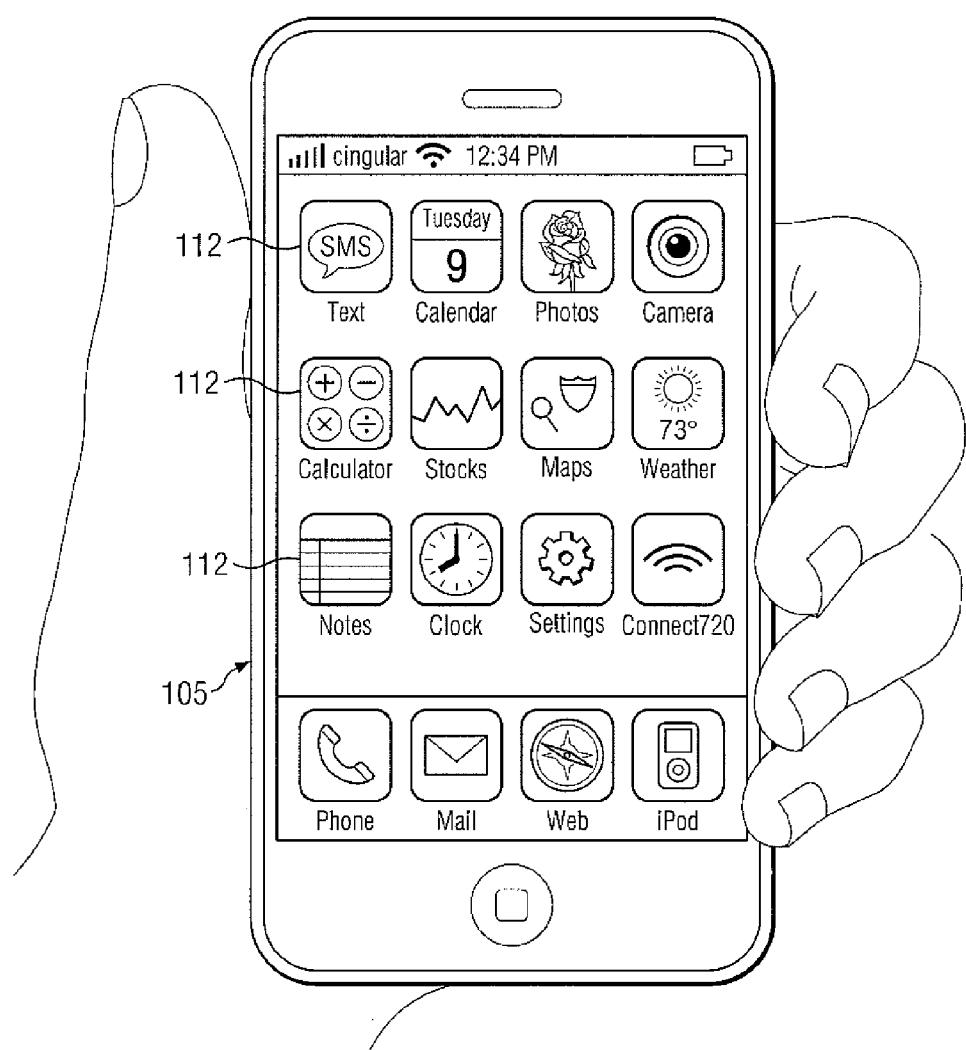
FIGS. 3a to 3f show the screen displays for the mobile unit as generated according to one embodiment of the present invention.
Figure 3C:
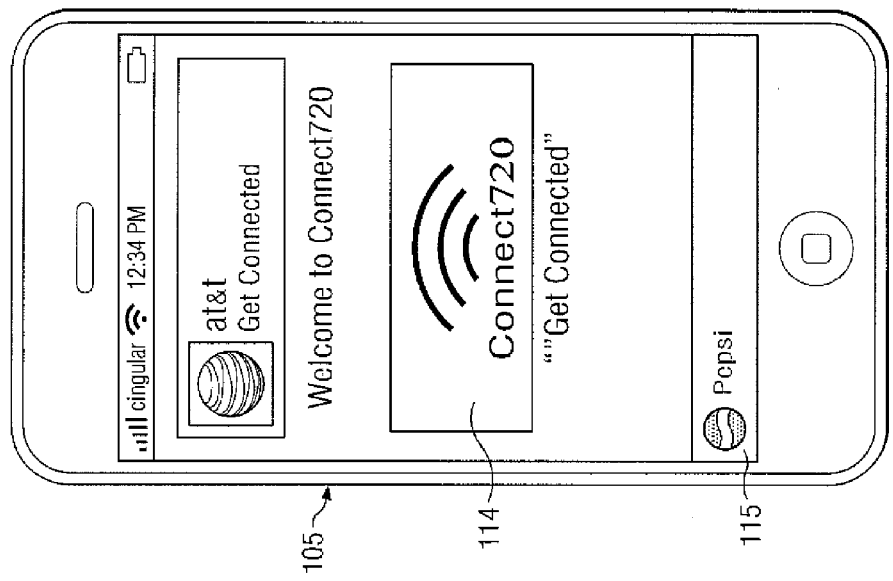
Figure 3B:
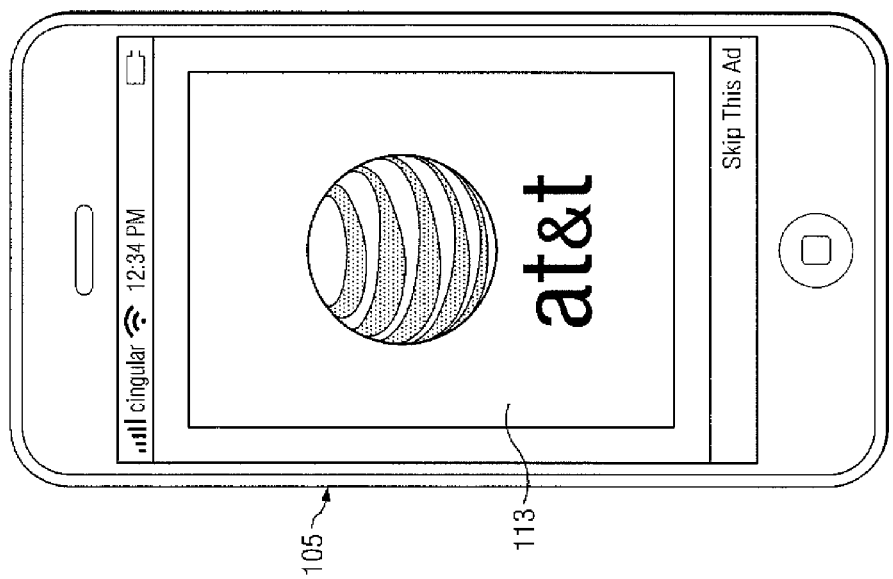
Figure 3E:
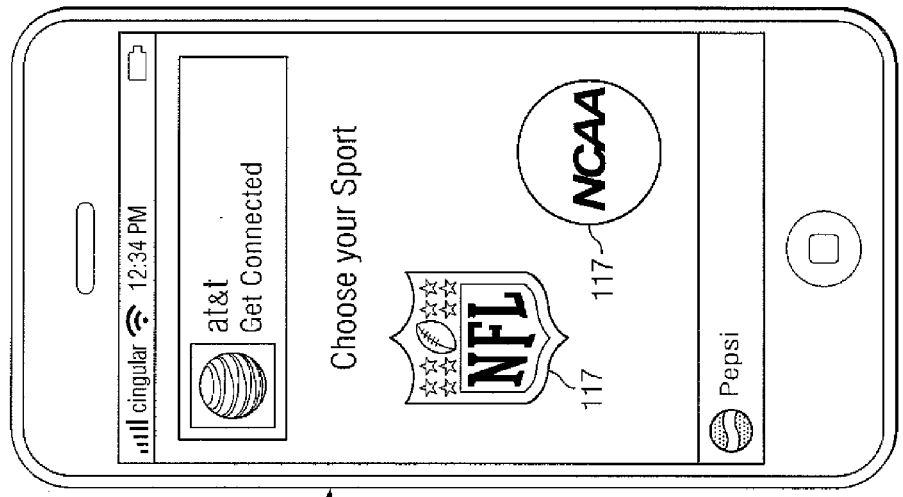
Figure 3D:
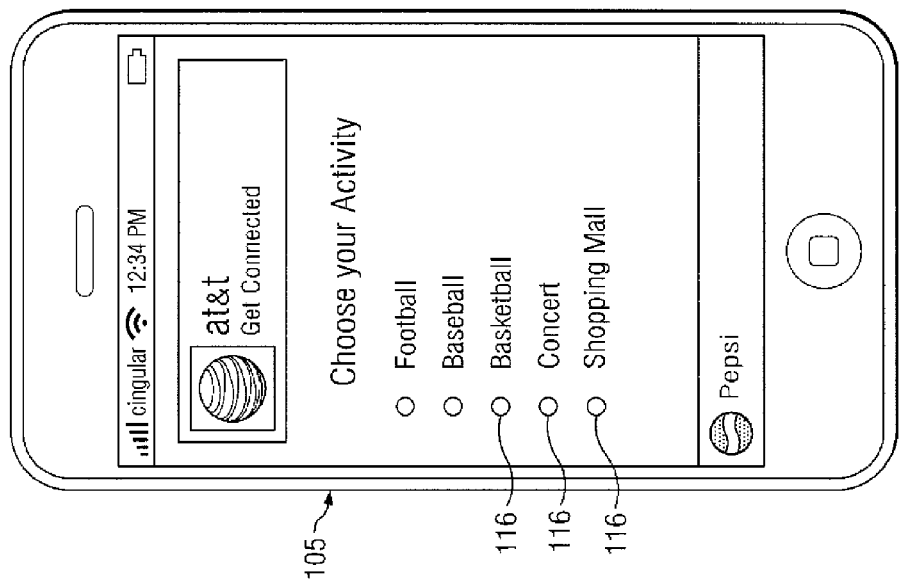
Figure 4:
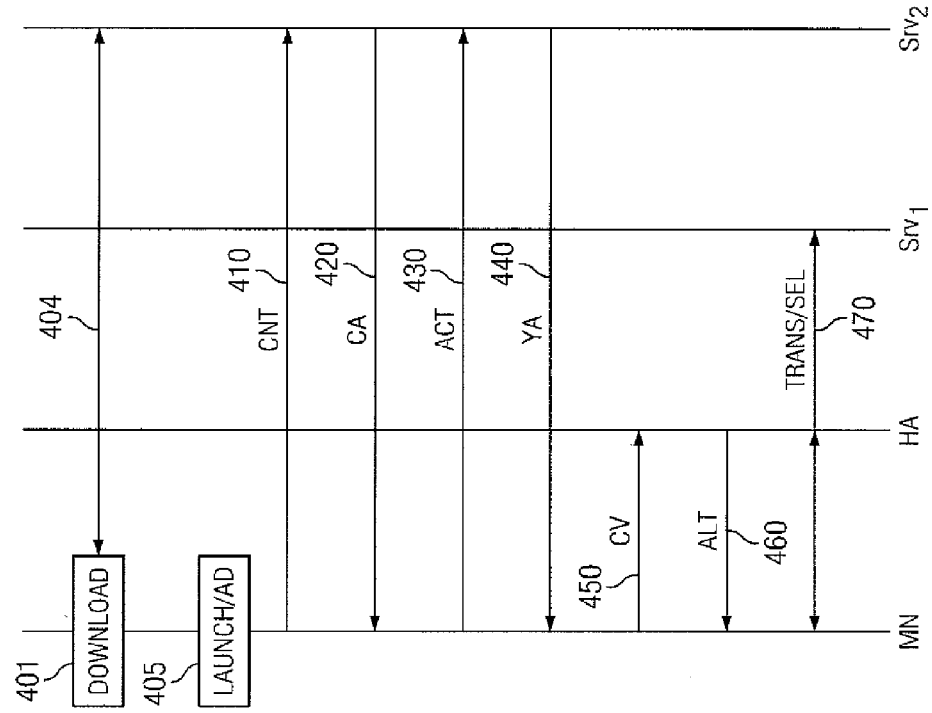
FIG. 4 shows a message flow for the embodiment described with respect to FIGS. 3a to 3f, FIGS. 5a to 5e show the screen displays for the mobile unit as generated according to one embodiment of the present invention.

As shown in FIG. 3a-3f, the different graphical user interfaces for the mobile hand-held unit 105 are shown based on different message sequences shown in FIG. 4. FIG. 3a shows applications icons 112 on hand-held mobile node 105, and the applications program for the present invention can be downloaded to the hand-held mobile node 105 as shown in step 401 of FIG. 4. Agreement with license terms can be obtained prior to or as part of initiating the download procedures in step 401. In step 401, the applications program is a set of programming code instructions and user interfaces and advertisements associated with the operation the present invention, and these programming instructions, interfaces and advertisements are downloaded onto the hand-held mobile node 105 at step 401 from server SRV2 185 via message flow 404. The same applications program, including the same programming instructions, interfaces, and advertisements, can be downloaded from other servers and sources of information, such as iTunes, Android Store, Carrier Stores, or other applications program software sources or stores.

After downloading the applications program in Step 401, the program proceeds to step 405 where the hand-held mobile unit 105 launches the applications program, which initiates the series of programming instructions. For this particular applications program, an advertisement 113 shown on FIG. 3b can be displayed, where these advertisements are stored in the applications program when installed on the hand-held mobile unit 105. A "hot button" can be pressed on this advertisement to directly link the hand-held mobile unit 105 to a server associated with the home page or other advertisement webpage maintained by the advertiser.

After launching the program at step 405, the screen shown on FIG. 3c is displayed on the hand-held mobile unit 105, including a "get connected" logo 114 and other advertising banners 115. The "get connected" logo 114 includes a "hot button" or other query that will allow the hand-held mobile unit 105 to send a connect CNT message 410 to the Server SRV2, which will request access to the system supporting the present invention. The Server SRV2 receives message 410 and responds to the hand-held mobile unit 105 with a chosen activity CA message 420, which provides the hand-held mobile unit 105 with available choices 116 for past or presently available activities 116 available for selection and connection.

These activities 116 can include sports activities, concerts or shopping mall activities. And, these activities 116 can be displayed as shown on FIG. 3d on hand-held mobile unit 105 based on the chosen activity message 420 received by the hand-held mobile unit 105, or these activities 116 can be displayed by league or association selections 117 as shown on FIG. 3e on hand-held mobile unit 105 based on the chosen activity message 420 received by the hand-held mobile unit 105. Alternatively, after selection of "sports" as the chosen activity, the screen shown on FIG. 3e on the hand-held mobile unit 105 can display the league or association selections 117 for selection by the hand-held mobile unit 105.

The hand-held mobile unit 105 will send a message identifying the activity selected by the hand-held mobile unit 105 to the computer server SRV2 185 on message 430, and the computer server SRV2 will analyze that selection and determine selections available for that chosen activity. For instance, if a shopping mall is chosen in message 430, the computer server SRV2 185 will determine available activities may include maps of the shopping mall, food locations, store locations, common questions and answers, security locations, emergency contact information, or "hot buttons" for direct connection to 911 services for fire, medical or police emergencies. As a second example, if "concerts" is selected, the computer server will determine what concerts have been recorded in memory or are currently be conducted. As a third example, if football sports is chosen as the selected activity in message 430, the computer server SRV2 185 will determine available football games, football teams, or football venues that can be selected from by the hand-held mobile unit 105, such as those selections 118 shown in FIG. 3f. The selections 118, or similar types of selections, will be sent to the hand-held mobile unit 105 in venue available VA message 440.

Figure 3F:
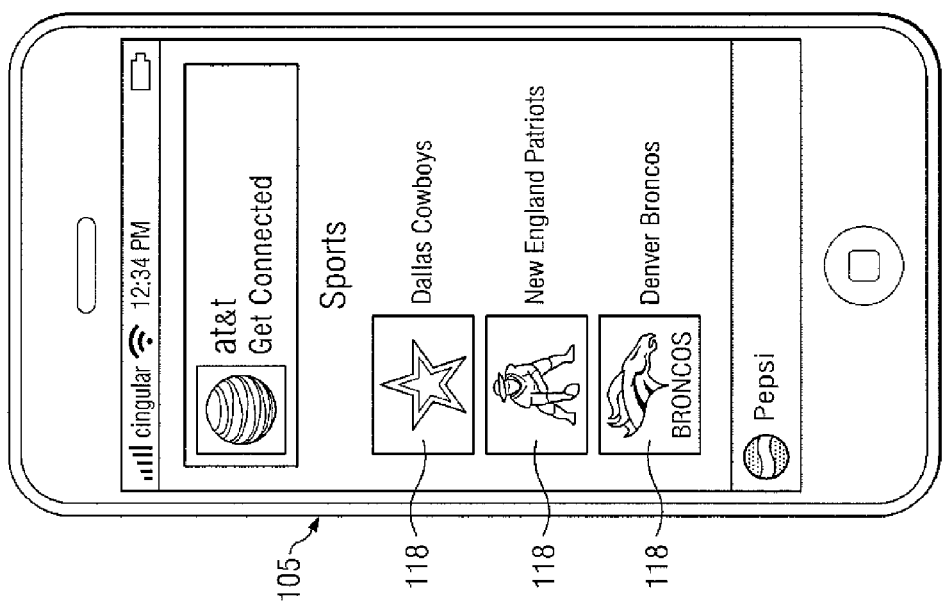

The hand-held mobile unit 105 will select from the options 118 shown on FIG. 3f in the VA message 440, and the hand-held mobile unit 105 will direct a communication to the home agent HA associated with the venue selected, such as the football game being played at the Cowboys stadium in message chosen venue CV 450 in FIG. 4. The home agent will respond to the hand-held mobile unit 105 with an alternative ALT message 460 providing the hand-held mobile unit 105 with available options at the venue for display and selection on the hand-held mobile unit 105. These available options include food service orders, specific cameras or video feeds from the game being played, or reservations for seats or boxes at future games.

The hand-held mobile unit 105 selects from the available options, which are processed through message transmissions 470 by the home agent HA or the computer server SRV1 associated with the selected venue depending on whether the hand-held mobile unit 105 selects video feeds or past video maintained by and through computer server SRV1 (in which case the message 470 will be supported by communications with SRV1) or the hand-held mobile unit 105 selects food orders, reservations or other location specific orders or requests (in which case the message 470 will be supported by communication with the home agent which communicates with remote locations, such as locations L1, L2 and L3 shown on FIG. 2).

Figure 5B:
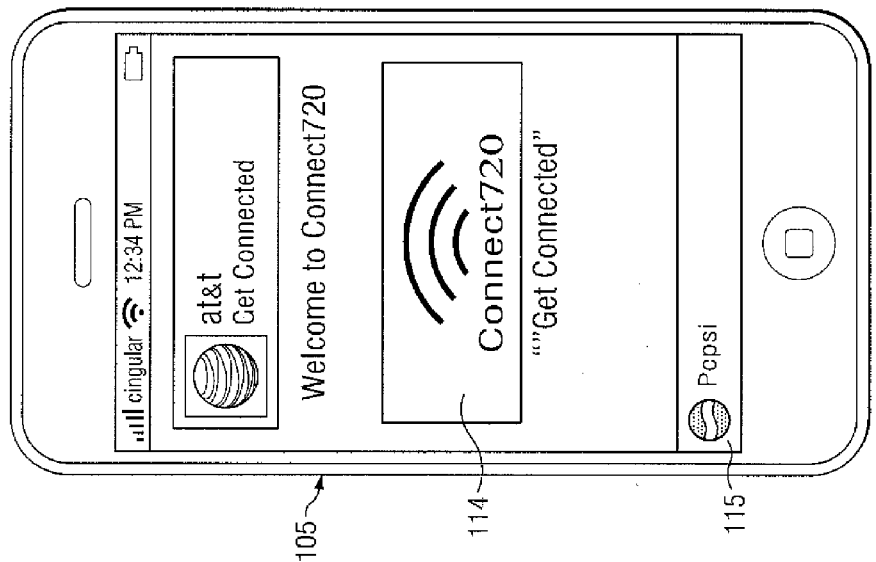
Figure 5A:
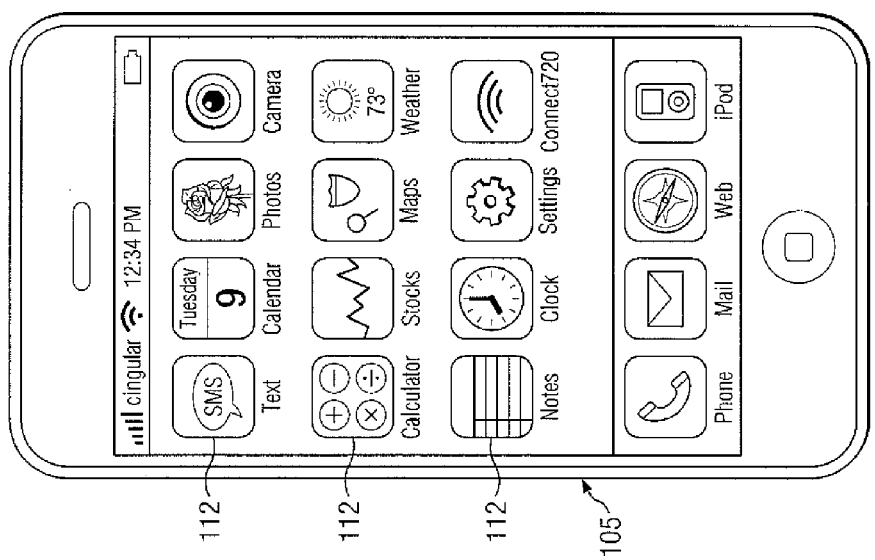
Figure 5C:
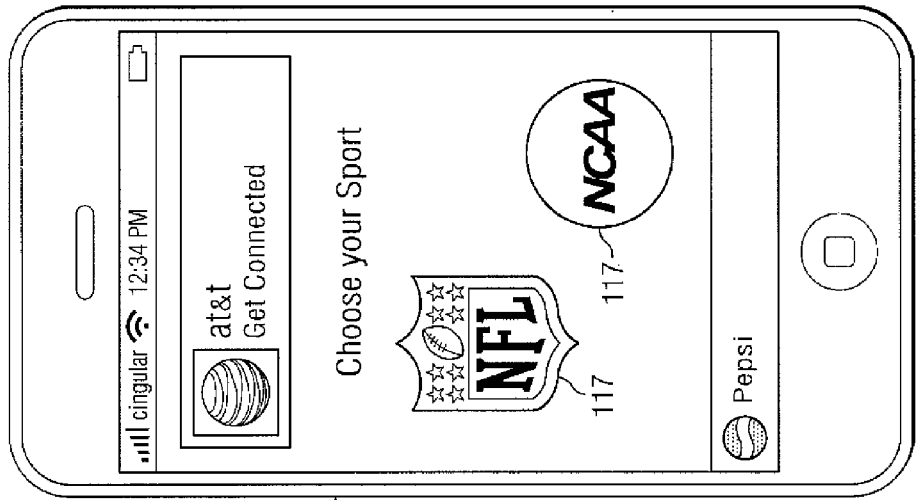
Figure 5D:
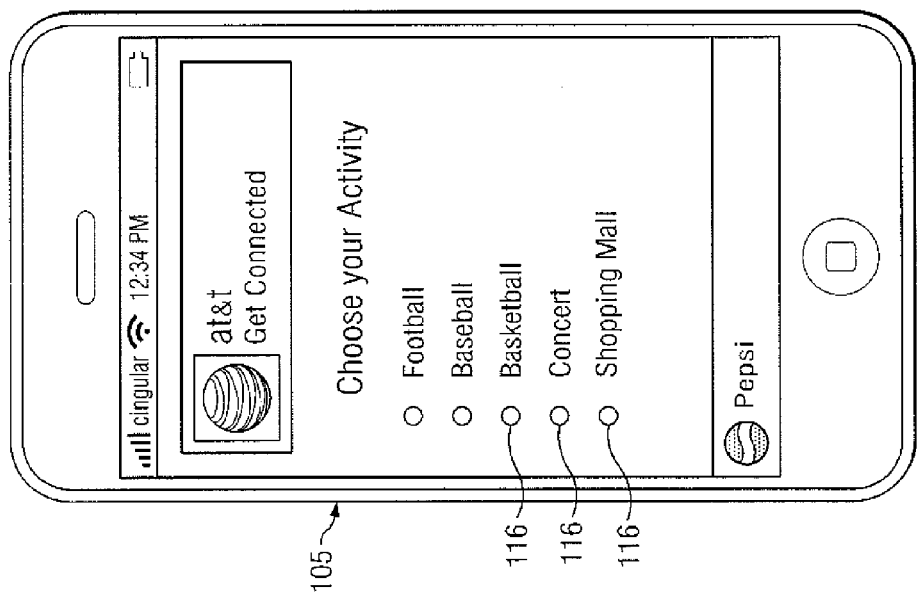
Figure 6:
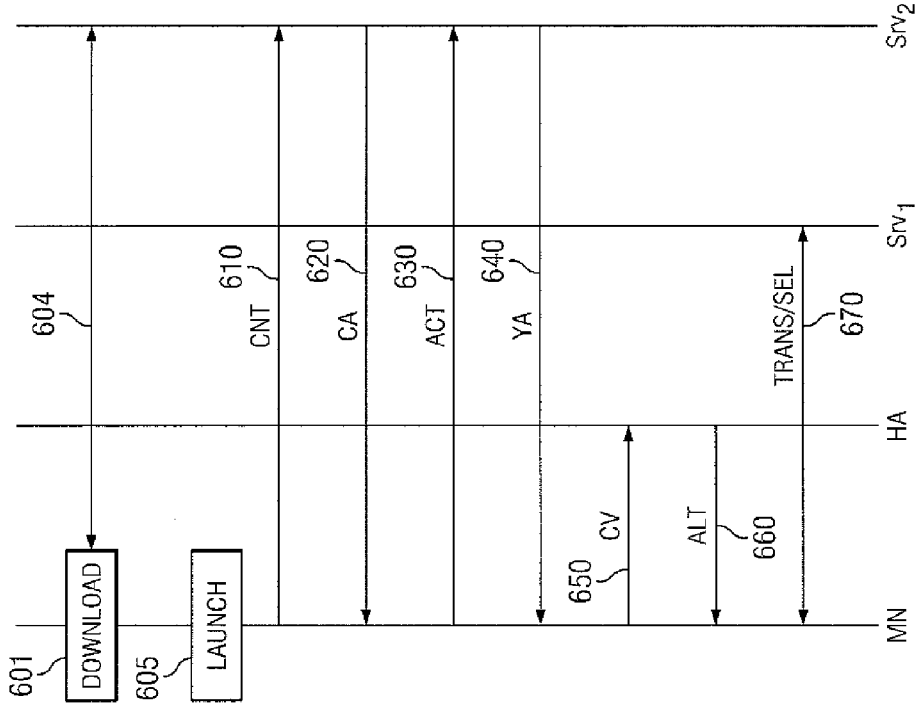
FIG. 6 shows a message flow for the embodiment described with respect to FIGS. 5a to 5f, FIGS. 7a to 7g show the screen displays for the mobile unit as generated according to one embodiment of the present invention.

As shown in FIG. 5a-5e, the different graphical user interfaces for the mobile hand-held unit 105 are shown based on different message sequences shown in FIG. 6. FIG. 5a shows applications icons 112 on hand-held mobile node 105, and the applications program for the present invention can be downloaded to the hand-held mobile node 105 as shown in step 601 of FIG. 6. In step 601, the applications program is a set of programming code instructions and user interfaces and advertisements associated with the operation the present invention, and these programming instructions, interfaces (and possibly advertisements) are downloaded onto the hand-held mobile node 105 at step 601 from server SRV2 185 via message flow 604. The same applications program, including the same programming instructions, interfaces, and advertisements, can be downloaded from other servers and sources of information, such as iTunes, Android Store, Carrier Stores, or other applications program software sources or stores.

After downloading the applications program in Step 601, the program proceeds to step 605 where the hand-held mobile unit 105 launches the applications program, which initiates the series of programming instructions. For this particular applications program, no advertisement 113 shown on FIG. 3b is displayed, but advertisements can be stored in the applications program when installed on the hand-held mobile unit 105. For any advertisements displayed, a "hot button" can be pressed on this advertisement to directly link the hand-held mobile unit 105 to a server associated with the home page or other advertisement webpage maintained by the advertiser.

After launching the program at step 605, the screen shown on FIG. 5b is displayed on the hand-held mobile unit 105, including a "get connected" logo 114 and other advertising banners 115. The "get connected" logo 114 includes a "hot button" or other query that will allow the hand-held mobile unit 105 to send a connect CNT message 610 to the Server SRV2, which will request access to the system supporting the present invention. The Server SRV2 receives message 610 and responds to the hand-held mobile unit 105 with a chosen activity CA message 620, which provides the hand-held mobile unit 105 with available choices 116 for past or presently available activities 116 available for selection and connection.

These activities 116 can include sports activities, concerts or shopping mall activities. And, these activities 116 can be displayed as shown on FIG. 5c on hand-held mobile unit 105 based on the chosen activity message 420 received by the hand-held mobile unit 105, or these activities 116 can be displayed by league or association selections 117 as shown on FIG. 5d on hand-held mobile unit 105 based on the chosen activity message 420 received by the hand-held mobile unit 105. Alternatively, after selection of "sports" as the chosen activity, the screen shown on FIG. 5d on the hand-held mobile unit 105 can display the league or association selections 117 for selection by the hand-held mobile unit 105.

The hand-held mobile unit 105 will send a message identifying the activity selected by the hand-held mobile unit 105 to the computer server SRV2 185 on message 630, and the computer server SRV2 will analyze that selection and determine selections available for that chosen activity. For instance, if a shopping mall is chosen in message 630, the computer server SRV2 185 will determine available activities may include maps of the shopping mall, food locations, store locations, common questions and answers, security locations, emergency contact information, or "hot buttons" for direct connection to 911 services for fire, medical or police emergencies. As a second example, if "concerts" is selected, the computer server will determine what concerts have been recorded in memory or are currently be conducted. As a third example, if football sports is chosen as the selected activity in message 630, the computer server SRV2 185 will determine available football games, football teams, or football venues that can be selected from by the hand-held mobile unit 105, such as those selections 118 shown in FIG. 5e. The selections 118, or similar types of selections, will be sent to the hand-held mobile unit 105 in venue available VA message 640.

Figure 5E:
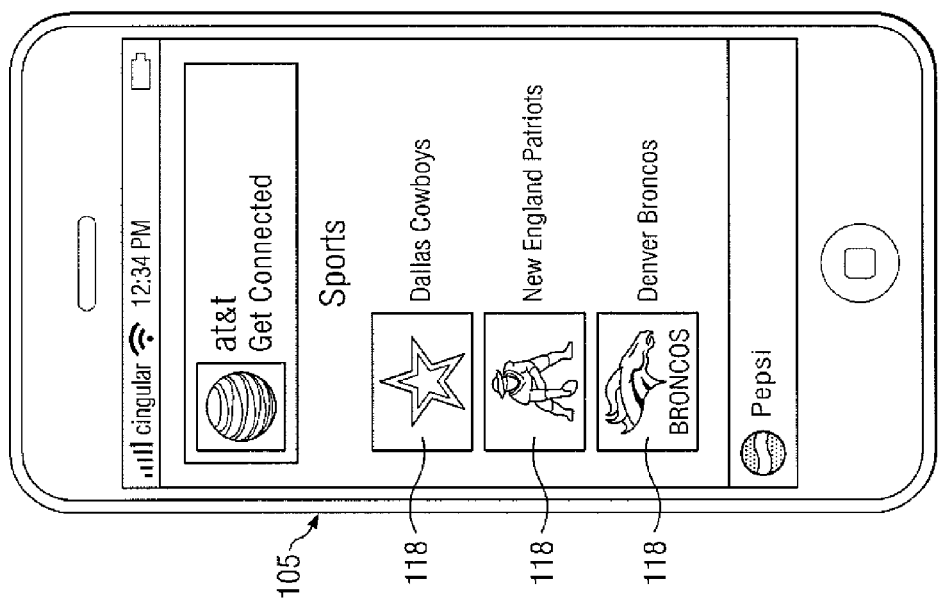

The hand-held mobile unit 105 will select from the options 118 shown on FIG. 5e provided in the VA message 440, and the hand-held mobile unit 105 will direct a communication to the home agent HA associated with the venue selected, such as the football game being played at the Cowboys stadium in message chosen venue CV 650 in FIG. 6. The home agent will respond to the hand-held mobile unit 105 with an alternative ALT message 660 providing the hand-held mobile unit 105 with available options at the venue for display and selection on the hand-held mobile unit 105. These available options include food service orders, specific cameras or video feeds from the game being played, or reservations for seats or boxes at future games.

The hand-held mobile unit 105 selects from the available options, which are processed through message transmissions 670 by the home agent HA or the computer server SRV1 associated with the selected venue depending on whether the hand-held mobile unit 105 selects video feeds or past video maintained by and through computer server SRV1 (in which case the message 670 will be supported by communications with SRV1) or the hand-held mobile unit 105 selects food orders, reservations or other location specific orders or requests (in which case the message 670 will be supported by communication with the home agent which communicates with remote locations, such as locations L1, L2 and L3 shown on FIG. 2).

Figure 7B:
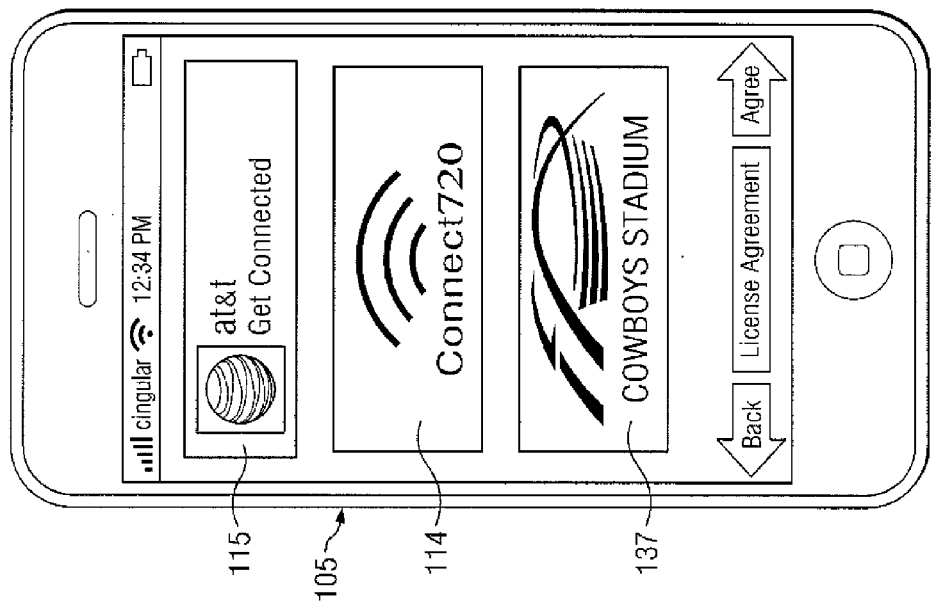
Figure 7A:
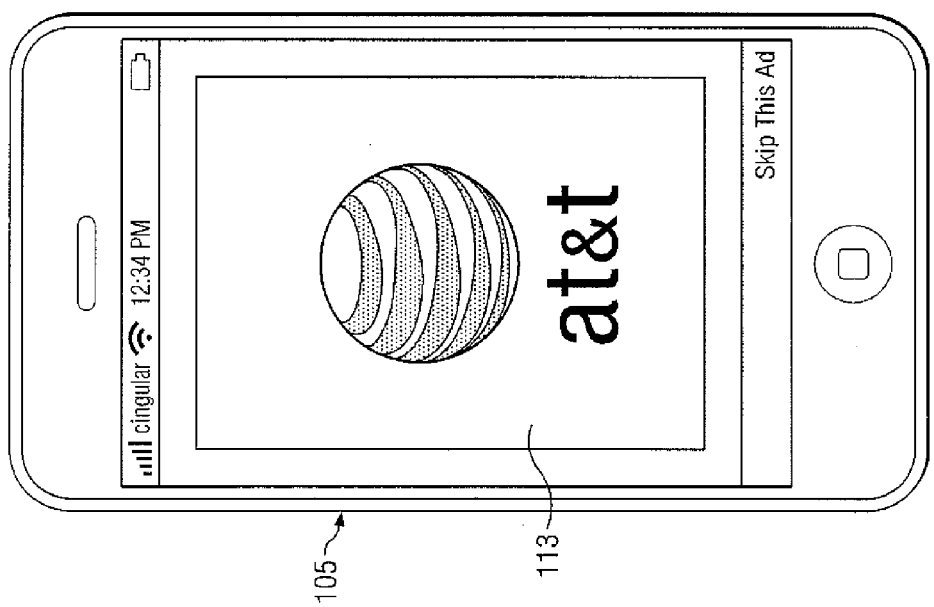
Figure 7D:
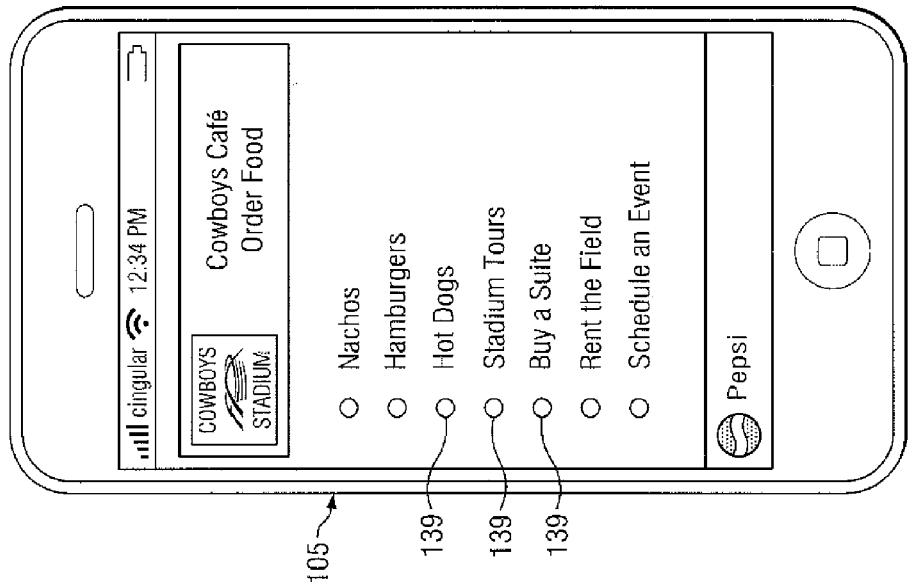
Figure 7C:
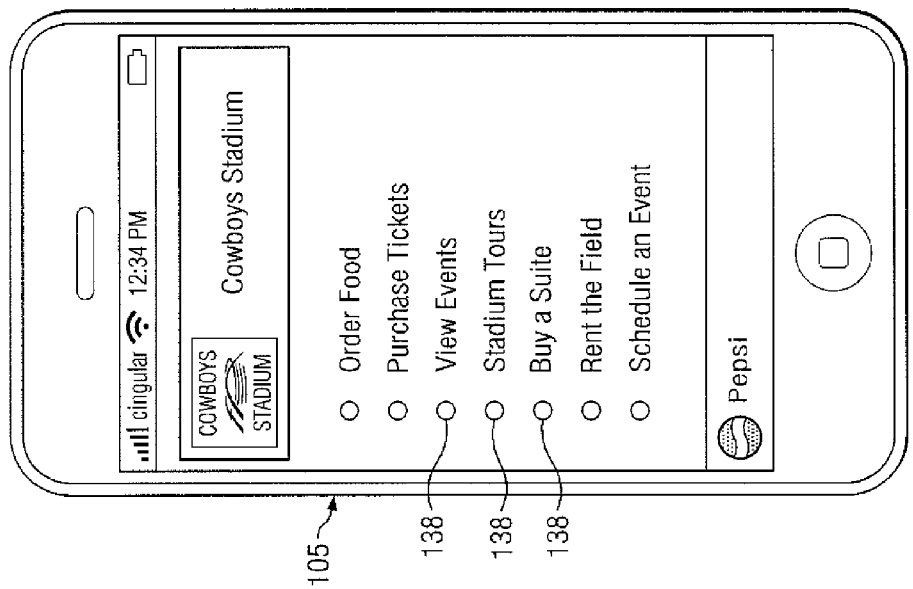
Figure 7F:
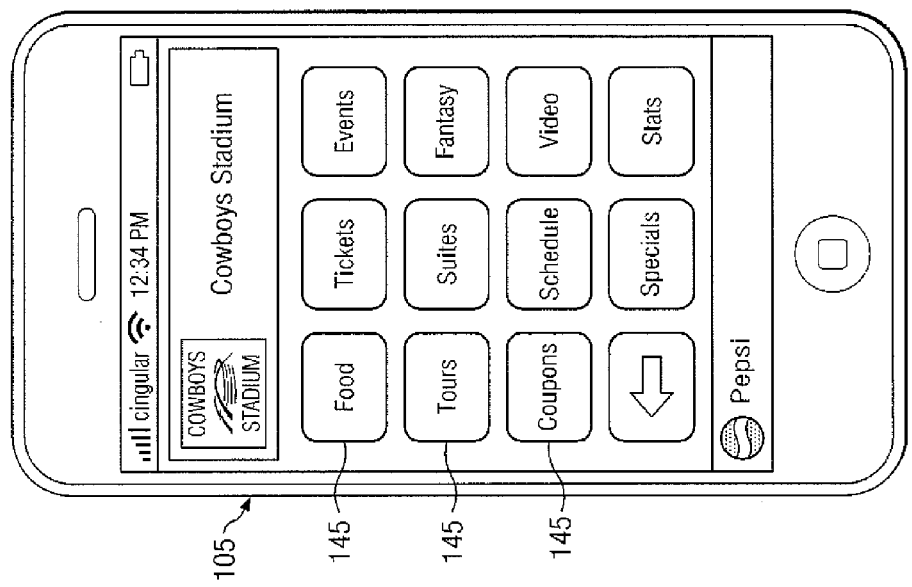
Figure 7E:
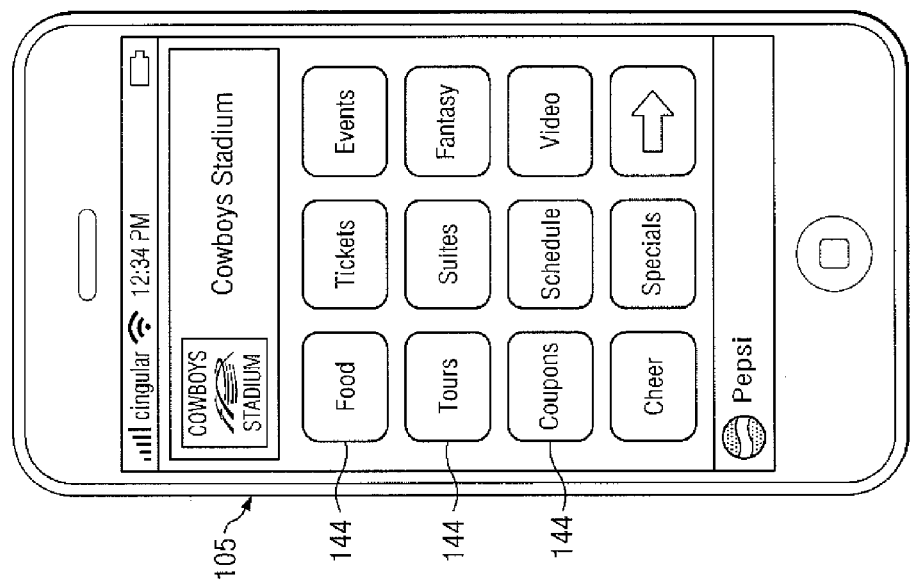
Figure 8:
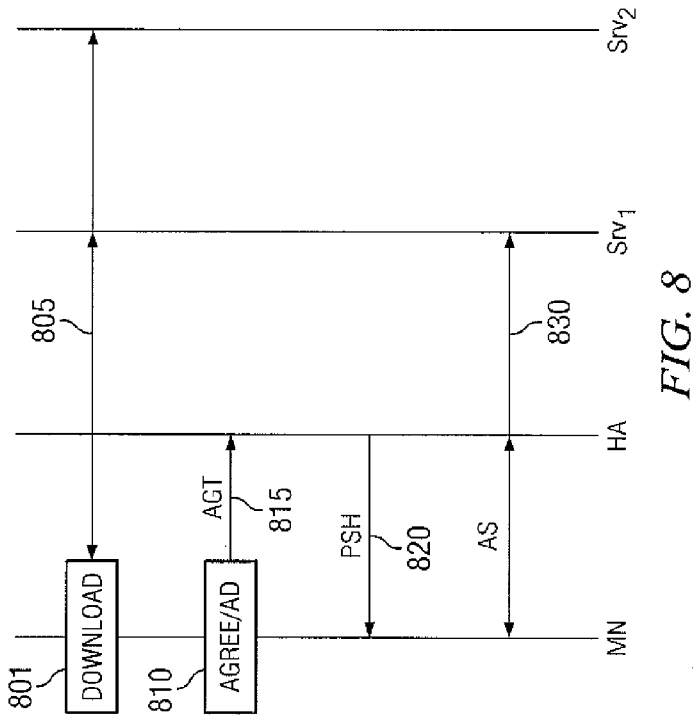
FIG. 8 shows a message flow for the embodiment described with respect to FIGS. 7a to 7g, FIGS. 9a to 9f show the screen displays for the mobile unit as generated according to one embodiment of the present invention.
Figure 7G:
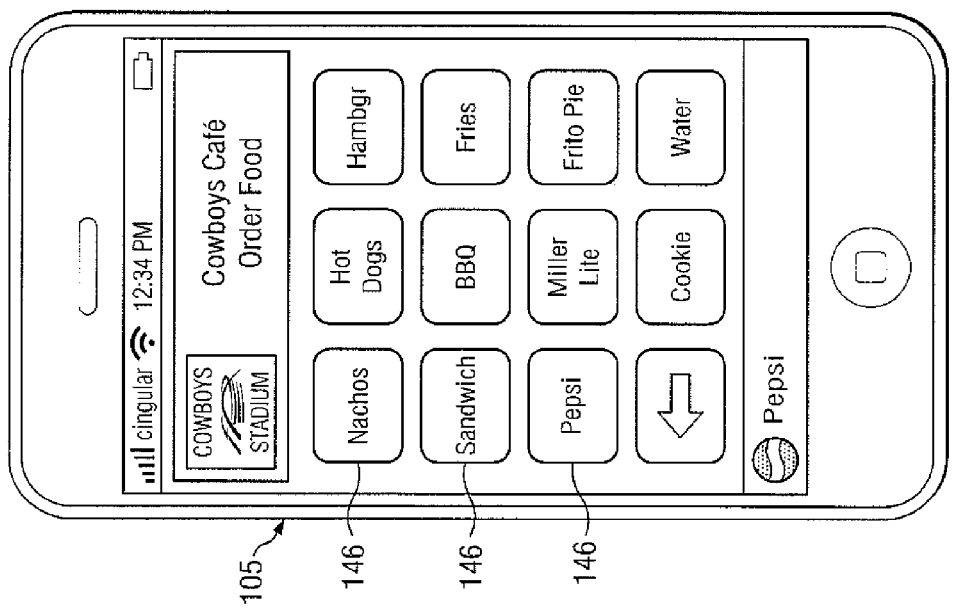

As shown in FIG. 7a-7g, a venue specific embodiment of the present invention is shown with message flow shown in FIG. 8. The applications program for the present invention can be downloaded to the hand-held mobile node 105 as shown in step 801 of FIG. 8. In step 801, the applications program is a set of programming code instructions and user interfaces and advertisements associated with the operation the present invention, and these programming instructions, interfaces and advertisements are downloaded onto the hand-held mobile node 105 at step 801 from server SRV2 185 via message flow 805 or from the compute server SRV1 associated with the sports venue 150. The same applications program, including the same programming instructions, interfaces, and advertisements, can be downloaded from other servers and sources of information, such as iTunes, Android Store, Carrier Stores, or other applications program software sources or stores.

For this particular applications program, an advertisement 113 shown on FIG. 7a can be displayed, where these advertisements are stored in the applications program when installed on the hand-held mobile unit 105. A "hot button" can be pressed on this advertisement to directly link the hand-held mobile unit 105 to a server associated with the home page or other advertisement webpage maintained by the advertiser.

After downloading the applications program in Step 801, the program proceeds to step 810 where the hand-held mobile unit 105 requires the hand-held mobile unit 105 to affirmatively agree to a license agreement before proceeding as shown in FIG. 7b. FIG. 7b shows the system support applications program 114 and the venue being serviced by this applications program by the symbol 137. Advertisement banners 115 may also be displayed on hand-held mobile unit 105. The affirmative agreement to the license agreement on screen FIG. 7b will send an AGT message 815 to the home agent HA associated with the venue. The home agent HA receives AGT message 815 and responds to the hand-held mobile unit 105 with a chosen activity PSH message 820, which provides the hand-held mobile unit 105 with available choices for network connections and past or presently available activities 138 at that specific venue available for selection and connection, as shown on FIG. 7c. These activities 138 can include food order selection, stadium tours, suite rental, field rental, scheduling of events, ticket purchase if the venue is a sports arena.

If the venue is a shopping mall, the home agent HA will determine available activities that may include maps of the shopping mall, food locations, store locations, common questions and answers, security locations, emergency contact information, or "hot buttons" for direct connection to 911 services for fire, medical or police emergencies. As a second example, if "concerts" is selected, the home agent HA will determine what concerts have been recorded in memory or are currently be conducted. The selections 138, or similar types of selections 139, 144, 145, and 146 as shown on FIGS. 7d, 7e, 7f and 7g, will be sent to the hand-held mobile unit 105 in venue available PSH message 820.

The hand-held mobile unit 105 will select from the options 138, 139, 144-146 as shown on FIG. 7c-7g in the AS message 830, and the hand-held mobile unit 105 will direct a communication to the home agent HA associated with the venue selected. The hand-held mobile unit 105 selects from the available options, which are processed through message transmissions 830 by the home agent HA or the computer server SRV1 associated with the selected venue depending on whether the hand-held mobile unit 105 selects video feeds or past video maintained by and through computer server SRV1 (in which case the message 830 will be supported by communications with SRV1) or the hand-held mobile unit 105 selects food orders, reservations or other location specific orders or requests (in which case the message 830 will be supported by communication with the home agent which communicates with remote locations, such as locations L1, L2 and L3 shown on FIG. 2).

Figure 9B:
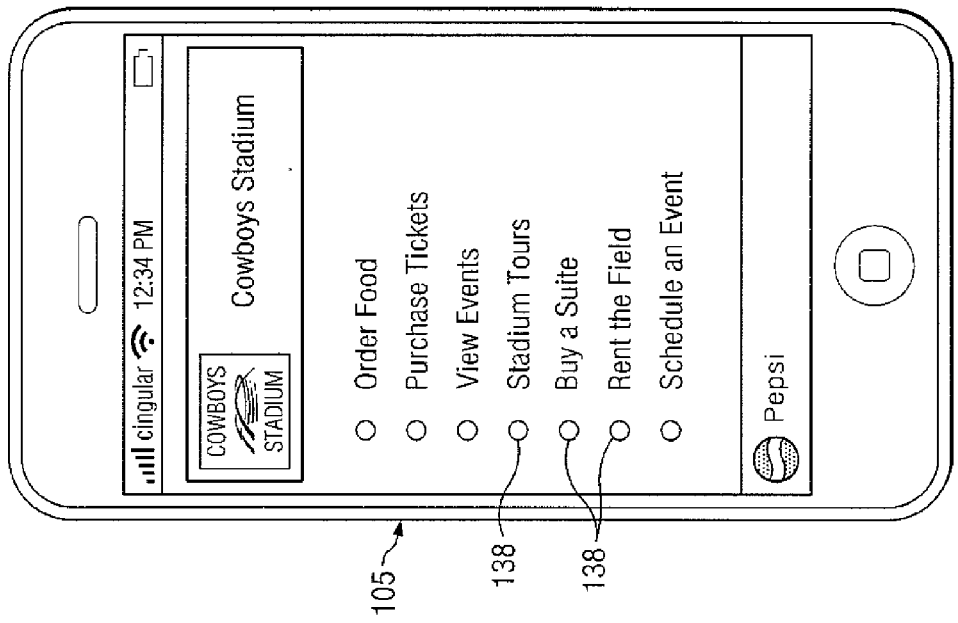
Figure 9A:
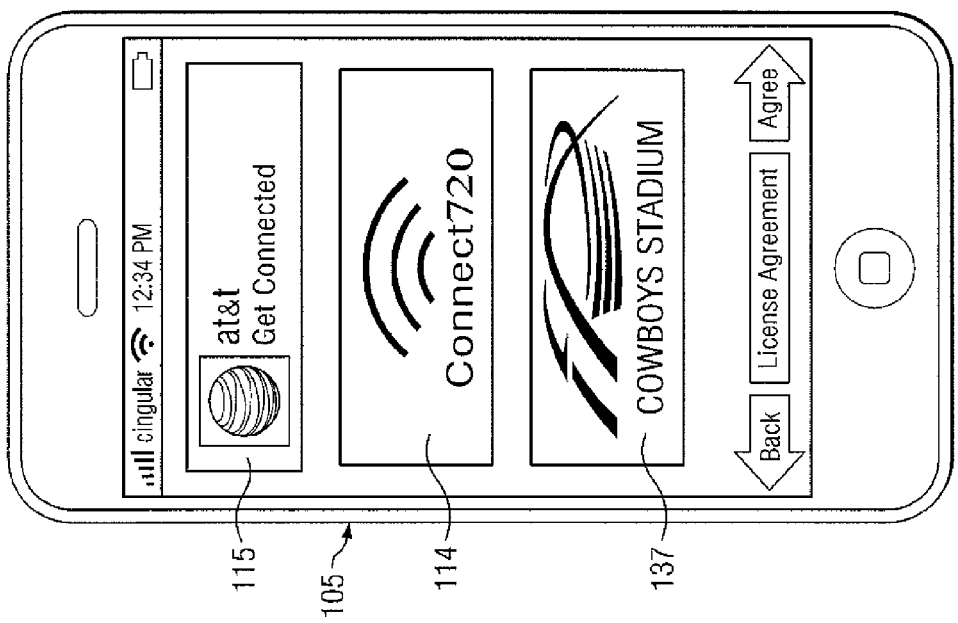
Figure 9D:
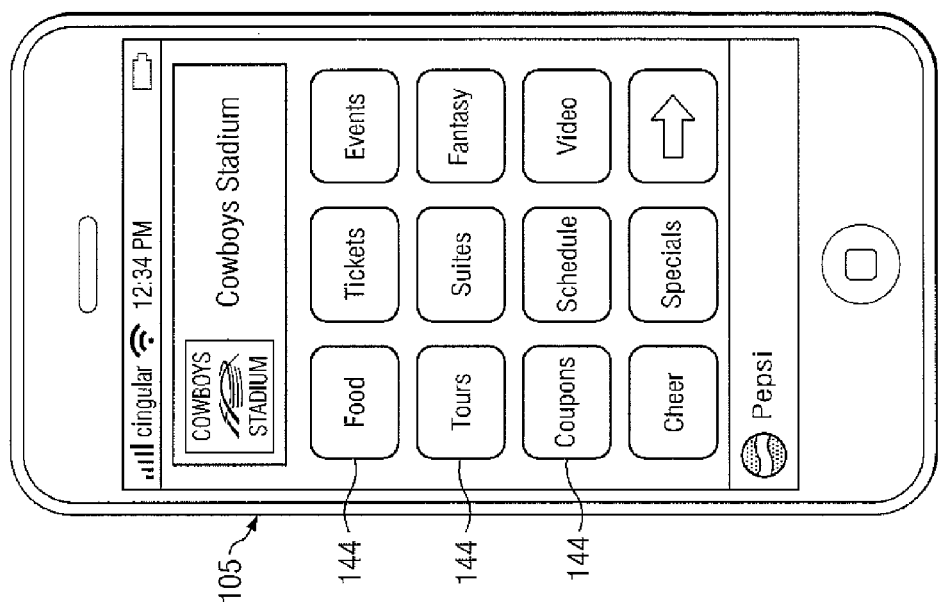
Figure 9C:
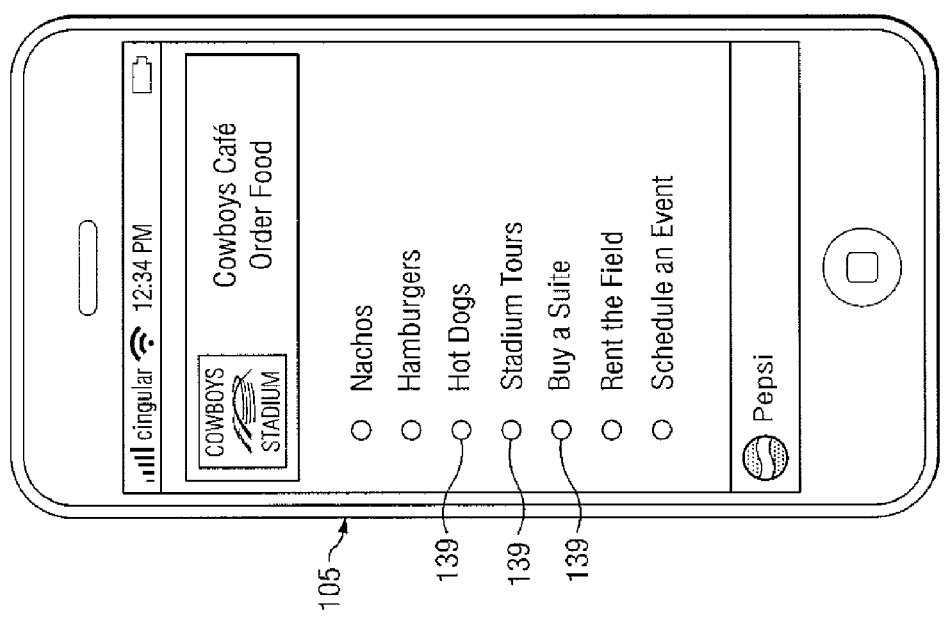
Figure 9F:
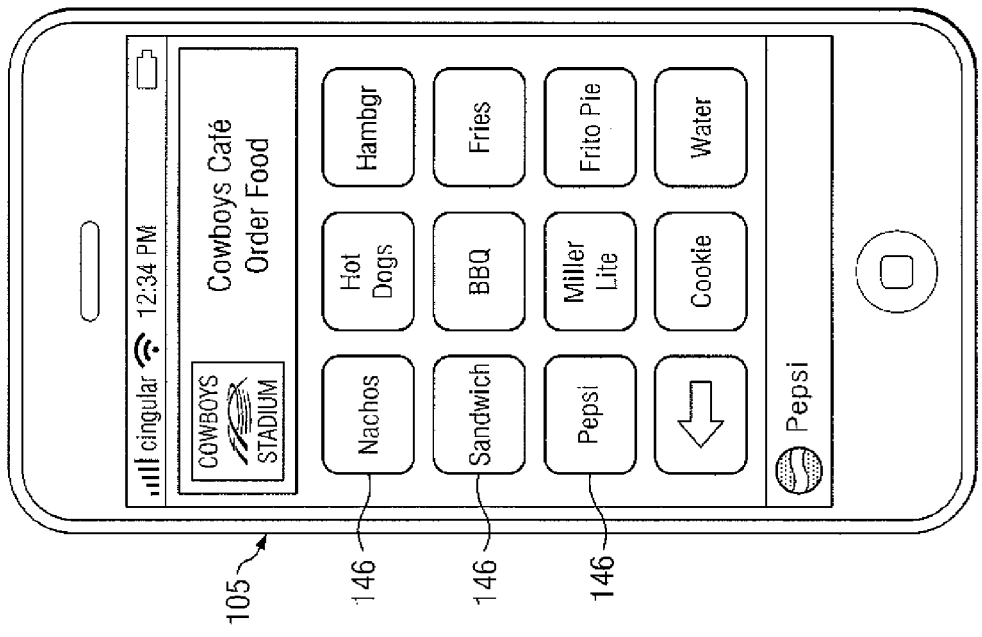
Figure 9E:
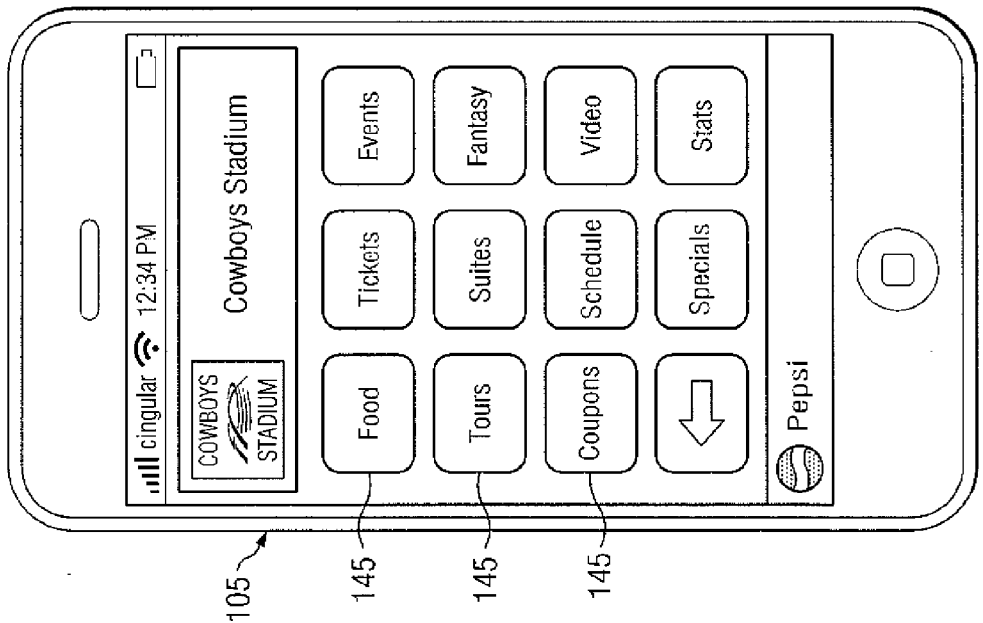
Figure 10:
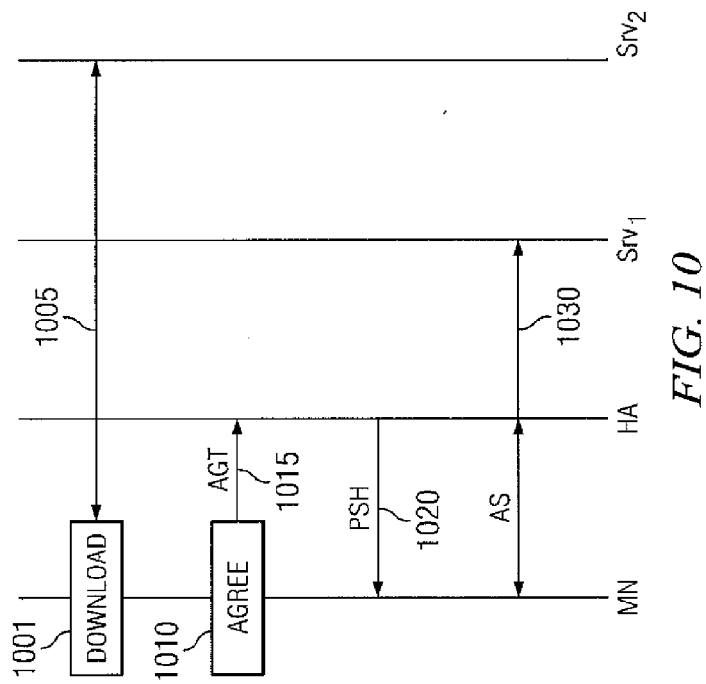
FIG. 10 shows a message flow for the embodiment described with respect to FIGS. 9a to 9f, FIGS. 11a to 11h show the screen displays for the mobile unit as generated according to one embodiment of the present invention.

As shown in FIG. 9a-9f, a venue specific embodiment of the present invention is shown with message flow shown in FIG. 10. Agreement with license terms can be obtained prior to or as part of initiating the download procedures in step 1001. In step 1001, the applications program is a set of programming code instructions and user interfaces and advertisements associated with the operation the present invention, and these programming instructions, interfaces and advertisements are downloaded onto the hand-held mobile node 105 at step 1001 from server SRV2 185 via message flow 1005 or from computer server SRV1 associated with the sports venue 150. The same applications program, including the same programming instructions, interfaces, and advertisements, can be downloaded from other servers and sources of information, such as iTunes, Android Store, Carrier Stores, or other applications program software sources or stores.

For this particular applications program, no advertisement is shown during the downloading process, but an advertisement 113 can be downloaded for future display as shown on FIG. 7a, where these advertisements are stored in the applications program when installed on the hand-held mobile unit 105. A "hot button" can be pressed on this advertisement to directly link the hand-held mobile unit 105 to a server associated with the home page or other advertisement webpage maintained by the advertiser.

After downloading the applications program in Step 1001, the program proceeds to step 1010 where the hand-held mobile unit 105 requires the hand-held mobile unit 105 to affirmatively agree to a license agreement before proceeding as shown in FIG. 9a. FIG. 9a shows the system support applications program 114 and the venue being serviced by this applications program by the symbol 137. Advertisement banners 115 may also be displayed on hand-held mobile unit 105. The affirmative agreement to the license agreement on screen FIG. 9a will send an AGT message 1015 to the home agent HA associated with the venue. The home agent HA receives AGT message 1015 and responds to the hand-held mobile unit 105 with a chosen activity PSH message 1020, which provides the hand-held mobile unit 105 with available choices with available choices for network connections and past or presently available activities 138 for past or presently available activities 138 at that specific venue available for selection and connection, as shown on FIG. 9b. These activities 138 can include food order selection, stadium tours, suite rental, field rental, scheduling of events, ticket purchase if the venue is a sports arena.

If the venue is a shopping mall, the home agent HA will determine available activities that may include maps of the shopping mall, food locations, store locations, common questions and answers, security locations, emergency contact information, and/or "hot buttons" for direct connection to 911 services for fire, medical or police emergencies. As a second example, if "concerts" is selected, the home agent HA will determine what concerts have been recorded in memory or are currently to be conducted. The selections 138, or similar types of selections 139, 144, 145, and 146 as shown on FIGS. 9c, 9d, 9e and 9f, will be sent to the hand-held mobile unit 105 in venue available PSH message 1020.

The hand-held mobile unit 105 will select from the options 138, 139, 144-146 as shown on FIG. 9b-9f in the AS message 1030, and the hand-held mobile unit 105 will direct a communication to the home agent HA associated with the venue selected. The hand-held mobile unit 105 selects from the available options, which are processed through message transmissions 1030 by the home agent HA or the computer server SRV1 associated with the selected venue depending on whether the hand-held mobile unit 105 selects video feeds or past video maintained by and through computer server SRV1 (in which case the message 1030 will be supported by communications with SRV1) or the hand-held mobile unit 105 selects food orders, reservations or other location specific orders or requests (in which case the message 1030 will be supported by communication with the home agent which communicates with remote locations, such as locations L1, L2 and L3 shown on FIG. 2).

Figure 11A:
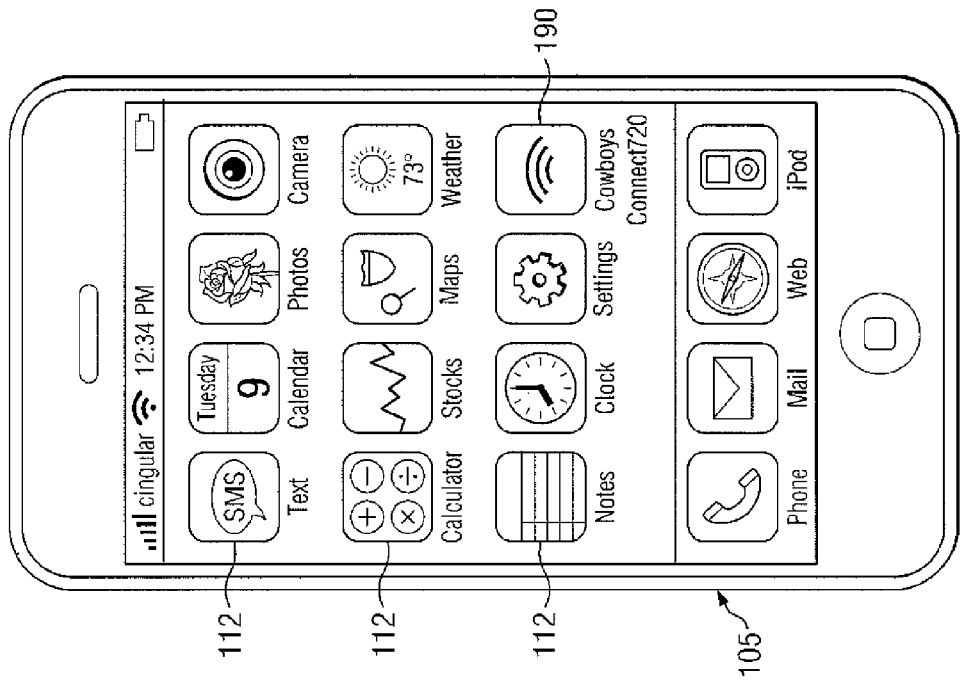
Figure 11C:
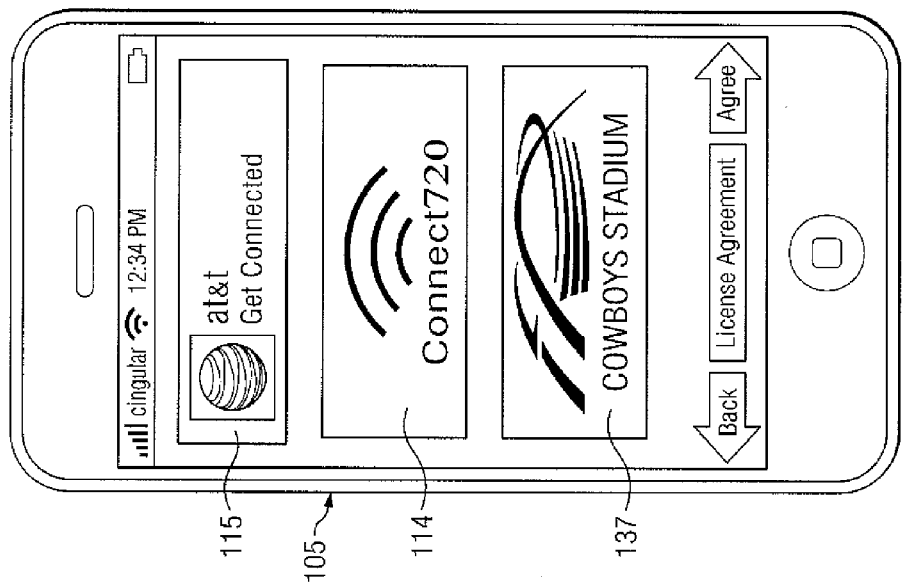
Figure 11B:
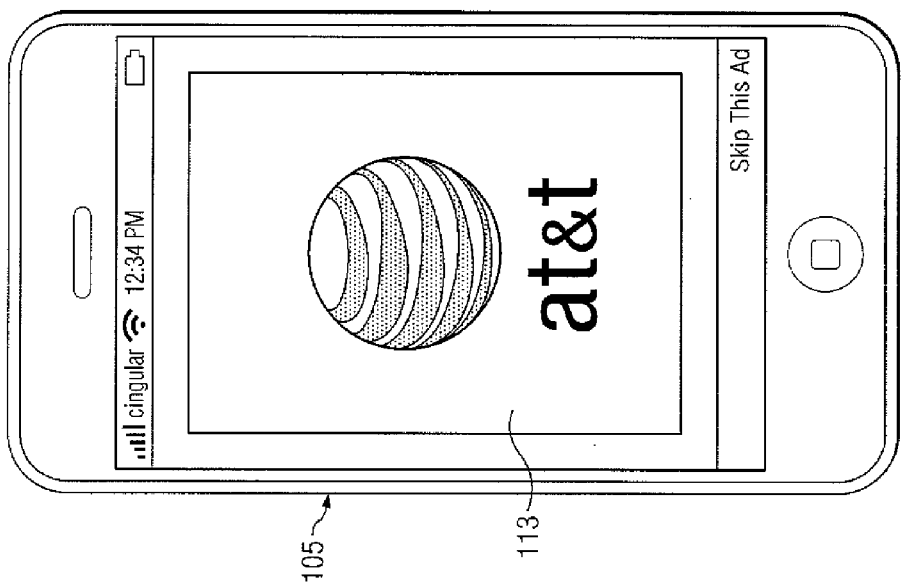
Figure 11E:
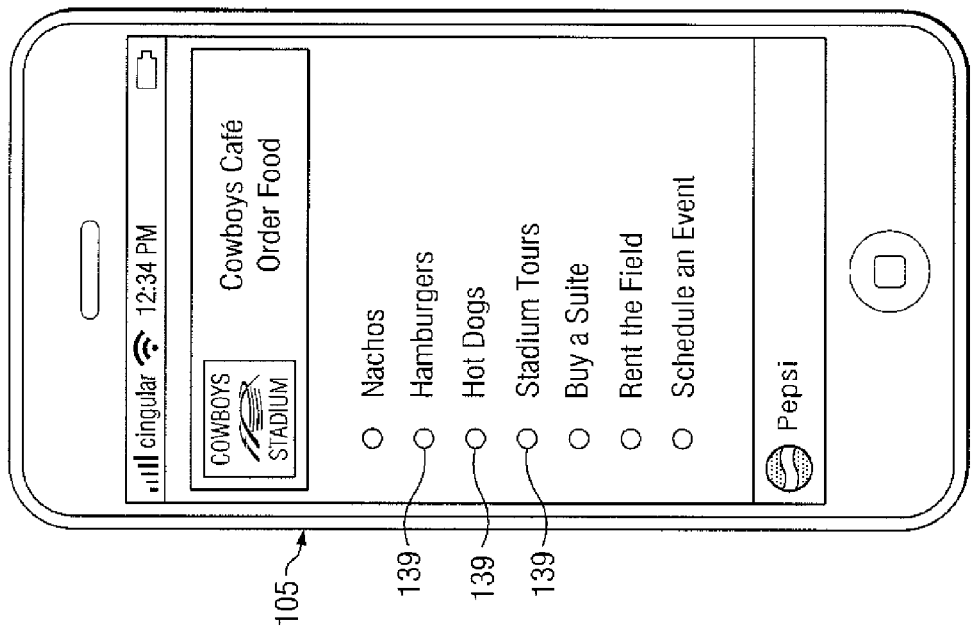
Figure 11D:
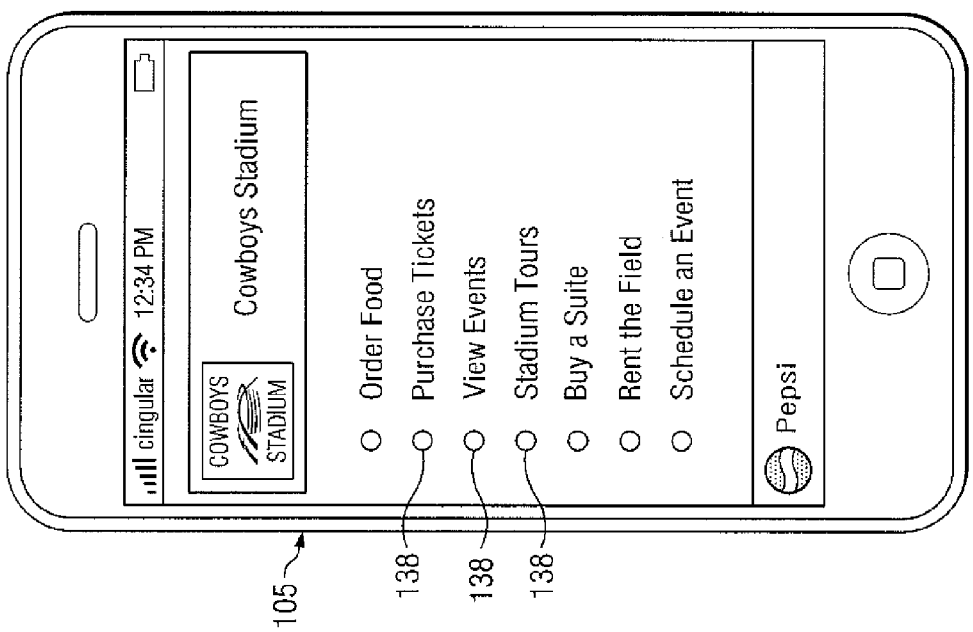
Figure 11G:
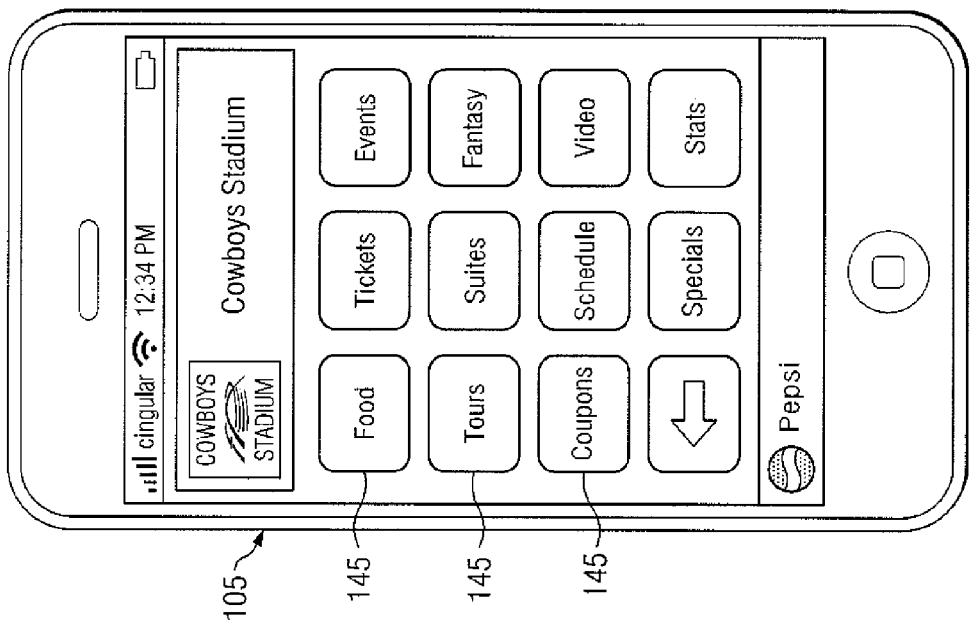
Figure 11F:
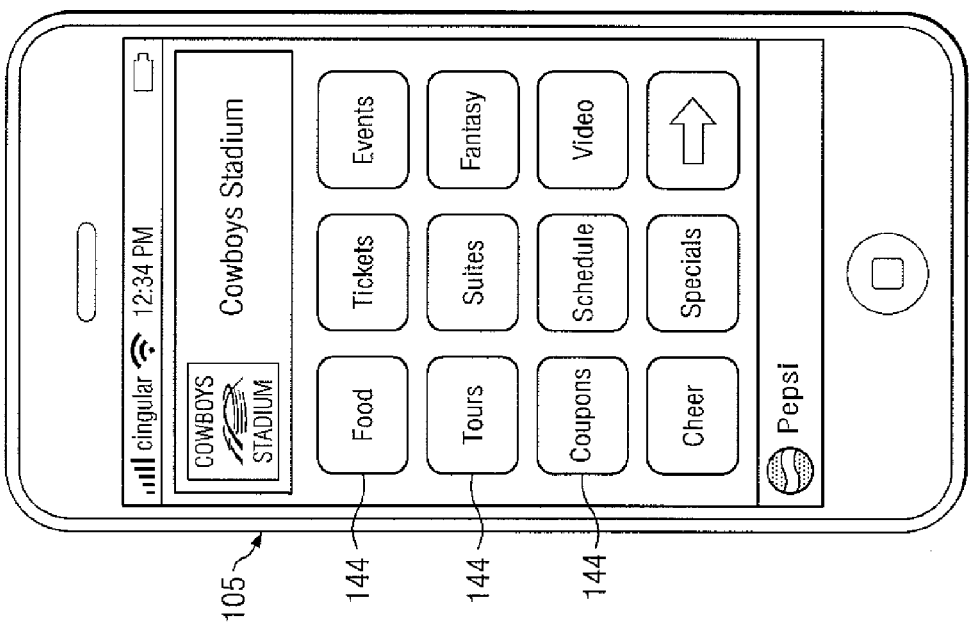
Figure 12:
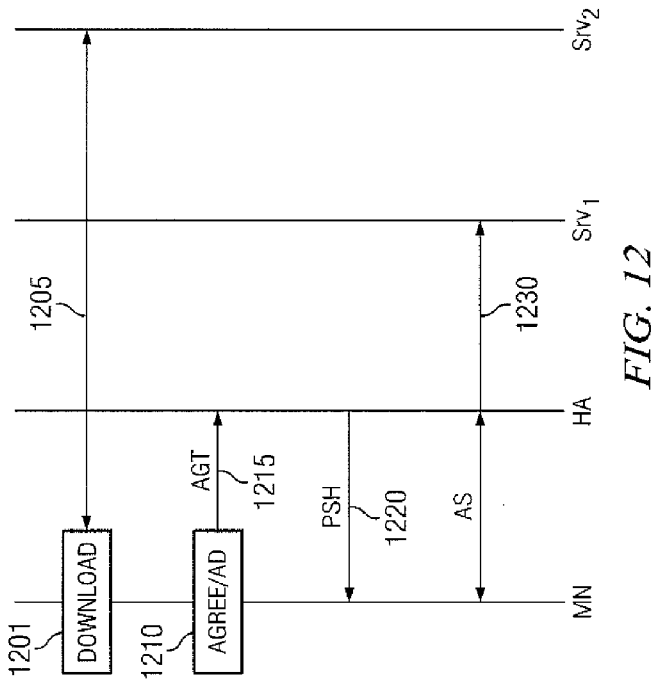
FIG. 12 shows a message flow for the embodiment described with respect to FIGS. 11a to 11h, FIGS. 13a to 13g show the screen displays for the mobile unit as generated according to one embodiment of the present invention, and, FIG. 14 shows a message flow for the embodiment described with respect to FIGS. 13a to 3g.
Figure 11H:
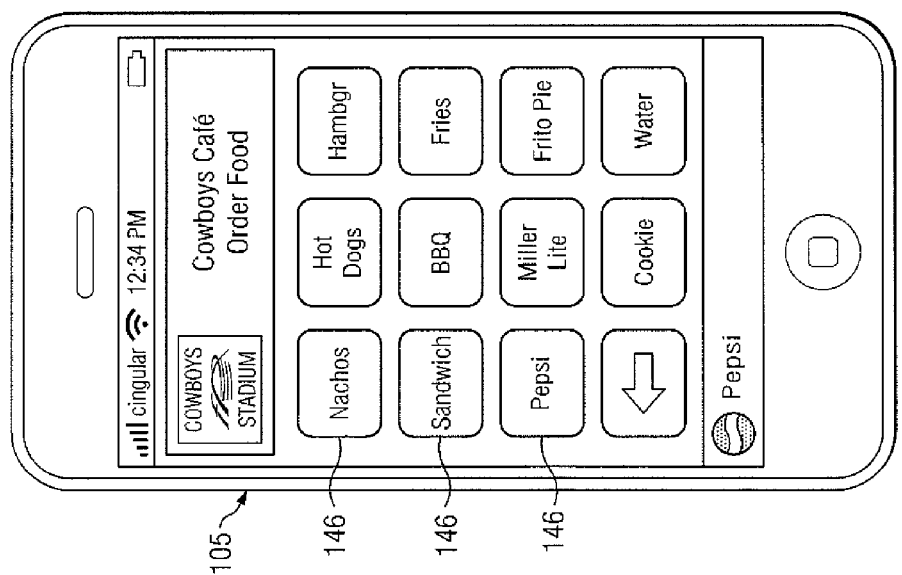

As shown in FIG. 11a-11h, a venue specific embodiment of the present invention is shown with message flow shown in FIG. 12. FIG. 11a shows applications icons 112 on hand-held mobile node 105, and the applications program icon 190 for the present invention can be shown on this page after it is downloaded to the hand-held mobile node 105 as shown in step 1201 of FIG. 4. The applications program for the present invention can be downloaded to the hand-held mobile node 105 as shown in step 1201 of FIG. 12. In step 1201, the applications program is a set of programming code instructions and user interfaces and advertisements associated with the operation the present invention, and these programming instructions, interfaces and advertisements are downloaded onto the hand-held mobile node 105 at step 1201 from server SRV2 185 via message flow 1205 or from the compute server SRV1 associated with the sports venue 150.

The same applications program, including the same programming instructions, interfaces, and advertisements, can be downloaded from other servers and sources of information, such as iTunes, Android Store, Carrier Stores, or other applications program software sources or stores. For this particular applications program, an advertisement 113 shown on FIG. 7a can be displayed, where these advertisements are stored in the applications program when installed on the hand-held mobile unit 105. A "hot button" can be pressed on this advertisement to directly link the hand-held mobile unit 105 to a server associated with the home page or other advertisement webpage maintained by the advertiser.

After downloading the applications program in Step 1201, the program proceeds to step 1210 where the hand-held mobile unit 105 requires the hand-held mobile unit 105 to affirmatively agree to a license agreement before proceeding as shown in FIG. 11c. FIG. 11c shows the system support applications program 114 and the venue being serviced by this applications program by the symbol 137. Advertisement banners 115 may also be displayed on hand-held mobile unit 105. The affirmative agreement to the license agreement on screen FIG. 9c will send an AGT message 1215 to the home agent HA associated with the venue. The home agent HA receives AGT message 1215 and responds to the hand-held mobile unit 105 with a chosen activity PSH message 1220, which provides the hand-held mobile unit 105 with available choices for network connections and past or presently available activities 138 at that specific venue available for selection and connection, as shown on FIG. 11d. These activities 138 can include food order selection, stadium tours, suite rental, field rental, scheduling of events, ticket purchase if the venue is a sports arena.

If the venue is a shopping mall, the home agent HA will determine available activities that may include maps of the shopping mall, food locations, store locations, common questions and answers, security locations, emergency contact information, and/or "hot buttons" for direct connection to 911 services for fire, medical or police emergencies. As a second example, if "concerts" is selected, the home agent HA will determine what concerts have been recorded in memory or are currently be conducted. The selections 138, or similar types of selections 139, 144, 145, and 146 as shown on FIGS. 11e, 11f, 11g and 11h, will be sent to the hand-held mobile unit 105 in venue available PSH message 1220.

The hand-held mobile unit 105 will select from the options 138, 139, 144-146 as shown on FIG. 11d-11h in the AS message 1230, and the hand-held mobile unit 105 will direct a communication to the home agent HA associated with the venue selected. The hand-held mobile unit 105 selects from the available options, which are processed through message transmissions 1230 by the home agent HA or the computer server SRV1 associated with the selected venue depending on whether the hand-held mobile unit 105 selects video feeds or past video maintained by and through computer server SRV1 (in which case the message 1230 will be supported by communications with SRV1) or the hand-held mobile unit 105 selects food orders, reservations or other location specific orders or requests (in which case the message 1230 will be supported by communication with the home agent which communicates with remote locations, such as locations L1, L2 and L3 shown on FIG. 2).

Figure 13A:
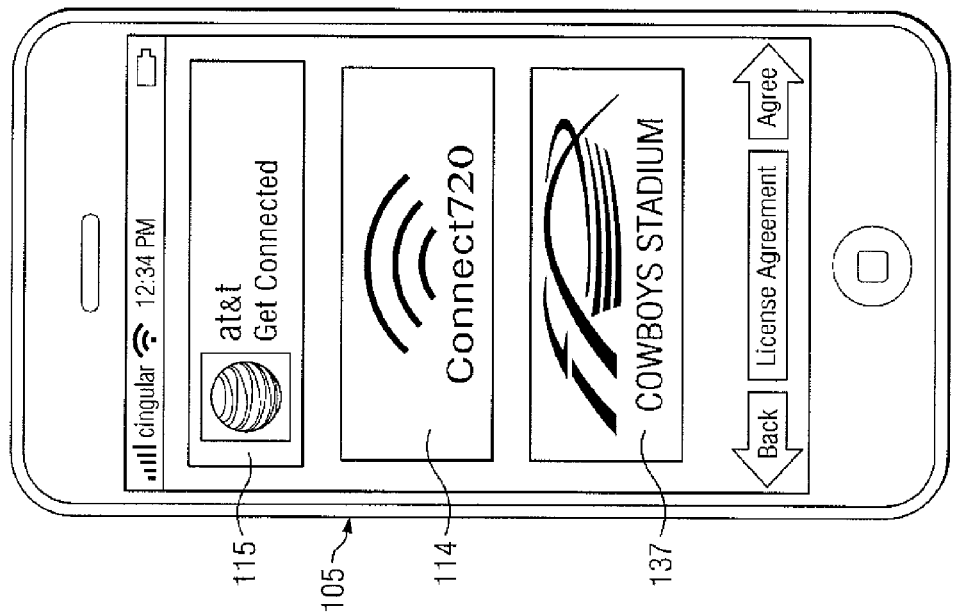
Figure 13B:
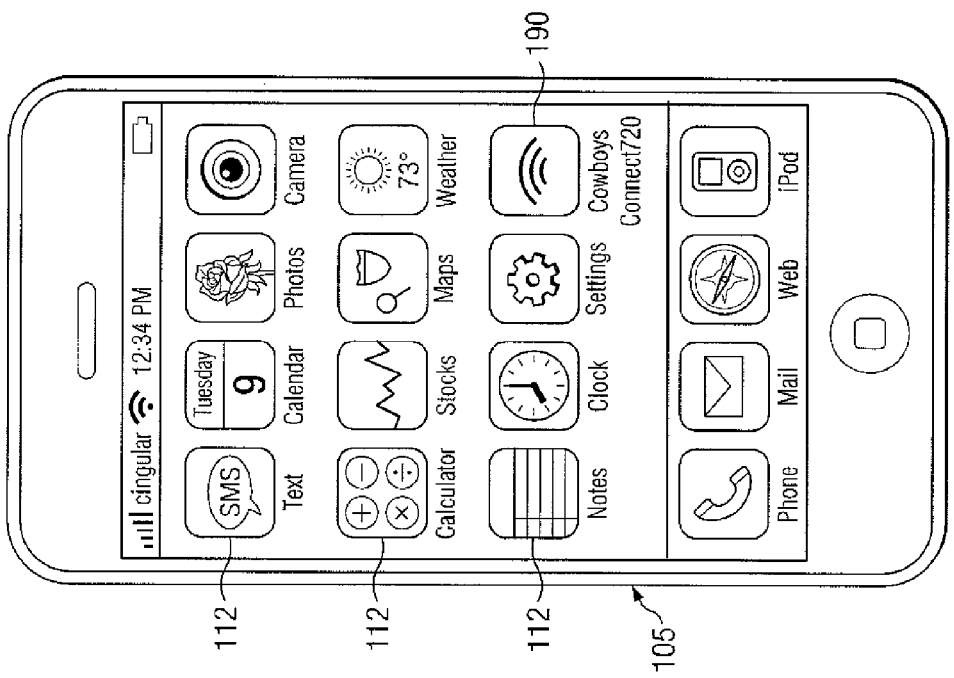
Figure 13D:
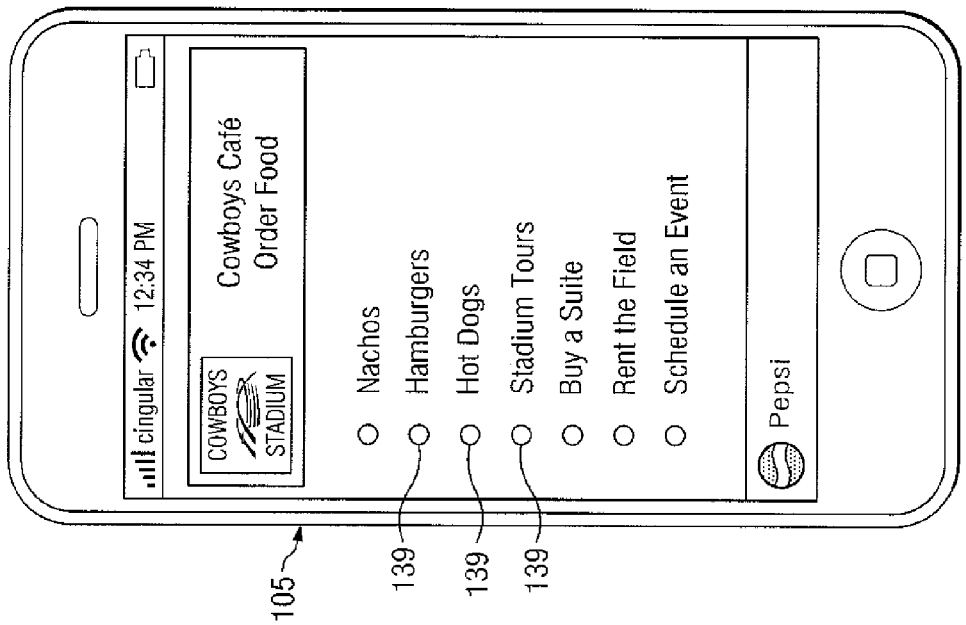
Figure 13C:
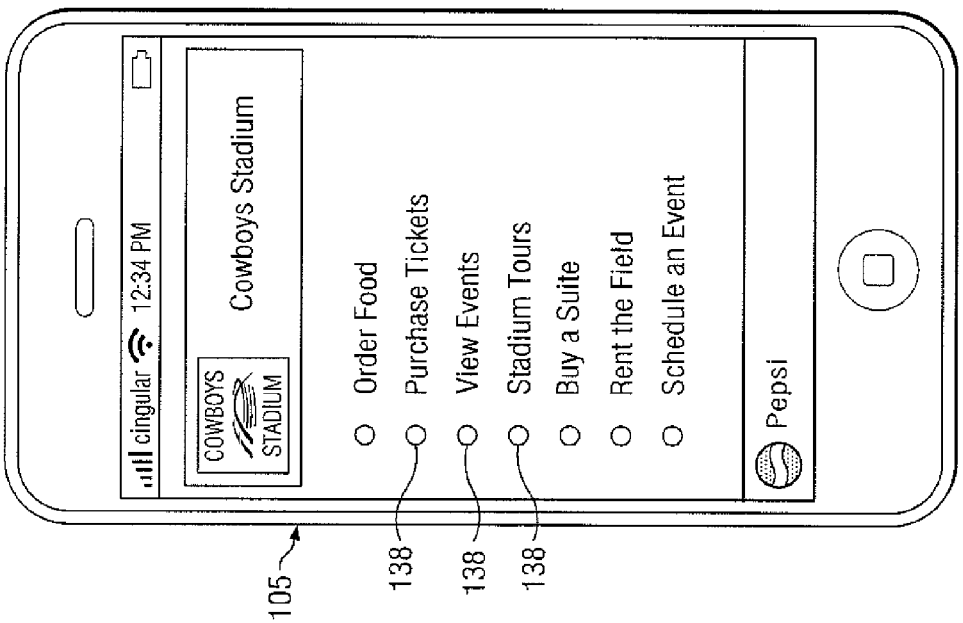
Figure 13F:
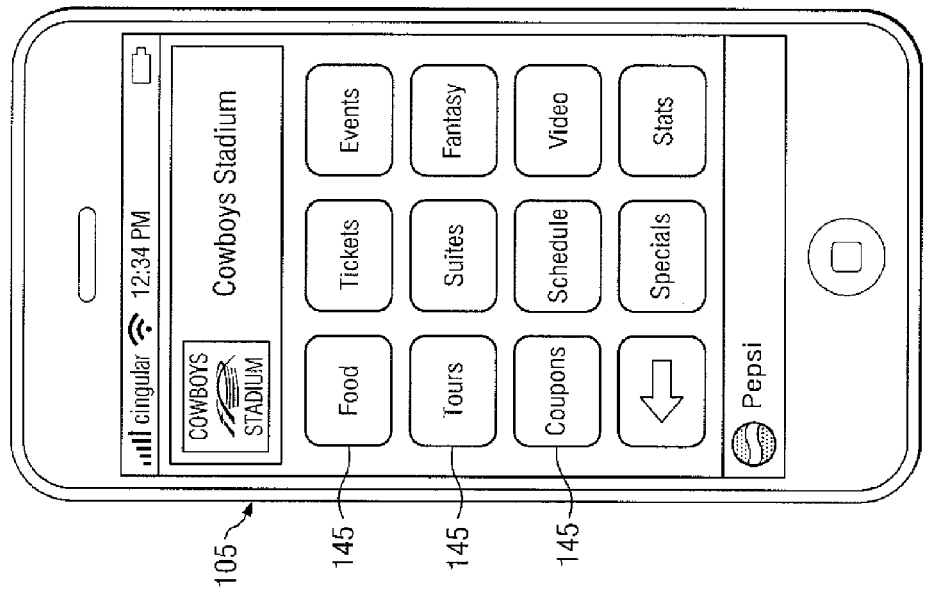
Figure 13E:
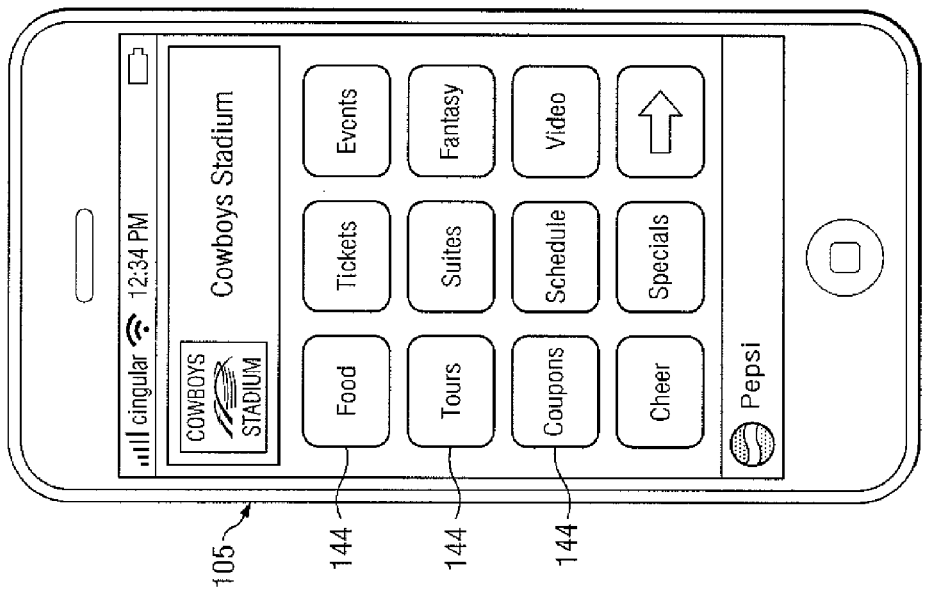
Figure 14:
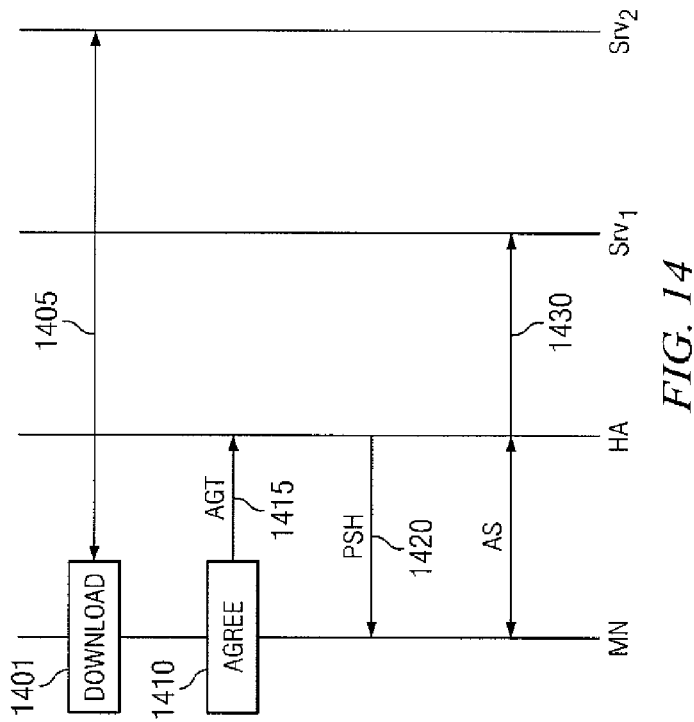
Figure 13G:
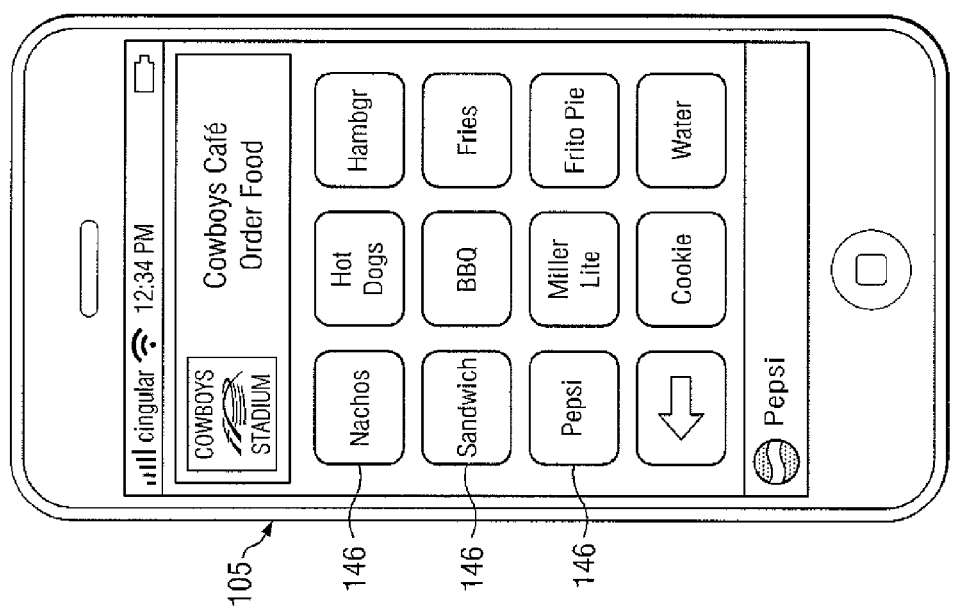

As shown in FIG. 13a-13g, a venue specific embodiment of the present invention is shown with message flow shown in FIG. 14. FIG. 13a shows applications icons 112 on hand-held mobile node 105, and the applications program icon 190 for the present invention can be shown on this page after it is downloaded to the hand-held mobile node 105 as shown in step 1401 of FIG. 4. In step 1401, the applications program is a set of programming code instructions and user interfaces and advertisements associated with the operation the present invention, and these programming instructions, interfaces and advertisements are downloaded onto the hand-held mobile node 105 at step 1401 from server SRV2 185 via message flow 1405 or from computer server SRV1 associated with the sports venue 150. The same applications program, including the same programming instructions, interfaces, and advertisements, can be downloaded from other servers and sources of information, such as iTunes, Android Store, Carrier Stores, or other applications program software sources or stores.

For this particular applications program, no advertisement is shown during the downloading process, but an advertisement 113 can be downloaded for future display as shown on FIG. 7a, where these advertisements are stored in the applications program when installed on the hand-held mobile unit 105. A "hot button" can be pressed on this advertisement to directly link the hand-held mobile unit 105 to a server associated with the home page or other advertisement webpage maintained by the advertiser.

After downloading the applications program in Step 1401, the program proceeds to step 1410 where the hand-held mobile unit 105 requires the hand-held mobile unit 105 to affirmatively agree to a license agreement before proceeding as shown in FIG. 13b. FIG. 13b shows the system support applications program 114 and the venue being serviced by this applications program by the symbol 137. Advertisement banners 115 may also be displayed on hand-held mobile unit 105. The affirmative agreement to the license agreement on screen FIG. 13b will send an AGT message 1415 to the home agent HA associated with the venue. The home agent HA receives AGT message 1415 and responds to the hand-held mobile unit 105 with a chosen activity PSH message 1420, which provides the hand-held mobile unit 105 with available choices with available choices for network connections and past or presently available activities 138 for past or presently available activities 138 at that specific venue available for selection and connection, as shown on FIG. 13c. These activities 138 can include food order selection, stadium tours, suite rental, field rental, scheduling of events, ticket purchase if the venue is a sports arena.

If the venue is a shopping mall, the home agent HA will determine available activities that may include maps of the shopping mall, food locations, store locations, common questions and answers, security locations, emergency contact information and/or "hot buttons" for direct connection to 911 services for fire, medical or police emergencies. As a second example, if "concerts" is selected, the home agent HA will determine what concerts have been recorded in memory or are currently be conducted. The selections 138, or similar types of selections 139, 144, 145, and 146 as shown on FIGS. 13d, 13e, 13f, and 13g, will be sent to the hand-held mobile unit 105 in venue available PSH message 1420.

The hand-held mobile unit 105 will select from the options 138, 139, 144-146 as shown on FIG. 13d-13g in the AS message 1430, and the hand-held mobile unit 105 will direct a communication to the home agent HA associated with the venue selected. The hand-held mobile unit 105 selects from the available options, which are processed through message transmissions 1430 by the home agent HA or the computer server SRV1 associated with the selected venue depending on whether the hand-held mobile unit 105 selects video feeds or past video maintained by and through computer server SRV1 (in which case the message 1430 will be supported by communications with SRV1) or the hand-held mobile unit 105 selects food orders, reservations or other location specific orders or requests (in which case the message 1430 will be supported by communication with the home agent which communicates with remote locations, such as locations L1, L2 and L3 shown on FIG. 2).

While the invention has been described, disclosed, illustrated and shown in various terms of certain embodiments or modifications which it has presumed in practice, the scope of the invention is not intended to be, nor should it be deemed to be, limited thereby, and such other modifications or embodiments as may be suggested by the teachings herein are particularly reserved, especially as they fall within the breadth and scope of the claims here appended.

The invention claimed is:

1. A communication system supporting the processing of communications from a mobile unit comprising:
 a home network associated with a first venue and having a home agent coupled to a computer server, said home agent and said computer server processing communications received from said mobile unit,
 a transceiver unit coupled to said home agent and said computer server for receiving and transmitting communications to said mobile unit, and,
 a first order processing unit and a second order processing unit located at a first order processing location and a second order processing location, respectively, said computer server coupled to said first processing unit and said second processing unit, respectively,
 said computer server capable of receiving a first location specific order communication from said mobile unit through said transceiver unit, said first location specific order communication confirming the purchase of an item by the user of the mobile unit to be delivered to a first specific location, said computer server determines the location of the mobile unit and determines whether said first or second order processing unit is the most proper unit to process the first location specific order communication, said computer server selecting said first or second order processing unit based on said determination of most proper order processing unit to process the first location specific order communication, and said computer server transmits said first location specific order communication to the selected said first or second order processing unit so said first location specific order communication can be processed at the proper order processing location relative first specific location.

2. A communication system according to claim 1 wherein said first location specific order communication received by the computer server is purchasing a food item, a service, a ticket item or a merchandise item, which is processed by the selected said first or second order processing unit to be delivered to said first specific location.

3. A communication system according to claim 1 further comprising:

a third order processing unit at a third order processing location, said computer server coupled to said third processing unit, said computer server determines whether said first, second or third order processing unit is the most proper to process the first location specific order communication, said computer server selects one of said first, second or third order processing units for processing the first location specific order communication, and said computer server transmits said first location specific order communication to the selected said first, second or third order processing unit so said first location specific order communication can be processed at the proper order processing location relative to the first specific location.

4. A communication system according to claim 1 wherein said computer server selects the proper order processing unit to process said first order communication based on distance proximity of the order processing unit from said mobile unit.

5. A communication system according to claim 1 wherein said computer server selects the proper order processing unit to process said first location specific order communication considering the amount and type of inventory available at the first or second order processing locations.

6. A communication system according to claim 1 wherein said first location specific order communication received by the computer server is purchasing one or more video images.

7. A communication system according to claim 1 further comprising:

a second home network associated with a second venue having a second home agent and a second computer server, said second computer server being coupled to said first computer server allowing the second computer server to process order communications relating to the second venue.

8. A communication system supporting the processing of communication from a mobile unit, comprising:

a home network associated with a first venue having a home agent coupled to a computer server, said home agent and computer server processing communications received from said mobile unit, a transceiver unit coupled to said home agent and computer server for receiving and transmitting communications to said mobile unit, said computer server capable of "pushing" an offer through the transceiver unit to said mobile unit, said offer capable of being engaged by a user with said mobile unit, a first processing unit and a second processing unit located at a first processing location and a second processing location, respectively, said computer server coupled to said first processing unit and said second processing unit, respectively, said computer server capable of receiving a first location specific request for information that requests a purchase of a product at a first specific location, said first location specific request for information transmitted from said mobile unit through said transceiver unit, said computer server determines the location of the mobile unit and determines whether said first or second processing unit is the most proper unit to process the first location specific request for information, said computer server selects said first or second processing unit based on said determination of most proper processing unit to process the first location specific request for information, and said computer server transmits said first location specific request for information to the selected said first or second processing unit so said first location specific request for information can be processed at the proper processing unit relative to the first specific location.

9. A communication system according to claim 8 wherein said first location specific request for information received by the computer server is a request for purchase information regarding food, services, tickets or merchandise, which is processed by the selected first or second processing unit to be delivered to said first specific location.

10. A communication system according to claim 8 further comprising:

a third processing unit at a third processing location, said computer server coupled to said third processing unit, said computer server determines whether said first, second or third processing unit is the most proper to process the first location specific request for information, said computer server selects one of said first, second or third processing units for processing said first location specific request for information, and said computer server transmits said first location specific request for information to the selected said first, second or third processing unit so said first location specific request for information offer can be processed at the proper processing location relative to the first specific location.

11. A communication system according to claim 8 wherein said computer server selects the proper processing unit to process said first location specific request for information based on the first or second processing unit that is least busy.

12. A communication system according to claim 8 wherein said first location specific request for information received by the computer server is requesting a purchase of one or more video images.

13. A communication system according to claim 8 wherein said computer server selects the proper processing unit to process said first location specific request for information based on the first or second processing unit with the proper memory.

14. A communication system according to claim 8 further comprising:

a second home network associated with a second venue having a second home agent and a second computer server, said second computer server being coupled to said first computer server allowing the second computer server to process requests for information relating to the second venue.

15. A communication system according to claim 8 wherein said first location specific request for information is an event or redemption opportunity.

16. A communication system according to claim 8 wherein said first location specific request for information offer connects the mobile unit to an outside vendor.

17. A method for processing communication transmissions from a mobile unit, comprising the steps of:
providing a first home network associated with a first venue, said first home network has a home agent and a coupled computer server, said computer server coupled to a first order processing unit at a first order processing location and a second order processing unit at a second order processing location, respectively,
receiving a first location specific order communication transmission from a mobile unit on a transceiver unit at the first venue,
transmitting the received first location specific order communication from the transceiver unit to the computer server, said first location specific order communication purchasing an item by the user to be delivered to a first specific location,
determining at said computer server the location of the mobile unit,
determining at said computer server whether said first or second order processing unit is the most proper to process the first location specific order communication,
selecting at said computer server one of said first or second order processing units based on the prior determination,
transmitting said first location specific order communication to the selected said first or second order processing unit, and
processing said first location specific order communication can at the proper order processing location relative to the first specific location.

18. The method of claim 17 wherein said first location specific order communication received by the computer server is the purchase order for a food item, a service, a ticket item or a merchandise item, which is processed by the selected said first or second order processing unit.

19. The method of claim 17 further comprising the steps of:
providing a third processing unit at a third order processing location that is coupled to said computer server,
determining at the computer server the location of the mobile node,
determining at the computer server whether said first, second or third processing unit is the most proper to process the first location specific order communication,
selecting at the computer server one of said first, second or third processing units based on the determination,
transmitting said first location specific order communication from said computer server to the selected said first, second or third processing unit so said first location specific order communication can be processed at the proper processing location relative to the first specific location.

20. The method of claim 17 wherein said computer server is selecting the proper order processing unit to process said first location specific order communication based on the first specific location specified by the user of the mobile unit.

21. The method of claim 17 wherein said computer server is selecting the proper order processing unit to process said first location specific order communication based on amount and type of inventory available at the first or second order processing locations.

22. The method of claim 17 wherein said first location specific order communication received by the computer server is purchasing one or more video images.

23. The method in claim 17 further comprising the steps of:
providing a second home network associated with a second venue, said second home network having a second computer server coupled to said first computer server;
transmitting a location specific order communication received by the first computer server to the second computer server if it relates to the second venue, and,
processing location specific order communications received by the second computer server as forwarded from the first computer server including requests for venue specific information and data relating to said second venue or venue-specific ordering information relating to said second venue.

24. A communication system according to claim 1 wherein said first location specific order communication received by the computer server is ordering one or more video feeds from one or more mobile cameras to be delivered to said first specific location.

25. A communication system according to claim 8 wherein said first location specific request for information received by the computer server is a request for information regarding one or more video feeds from one or more mobile cameras to be delivered to said first specific location.

26. The method of claim 17 wherein said first location specific order communication received by the computer server is ordering one or more video feeds from one or more mobile cameras to be delivered to said first specific location.

* * * * *

UNITED STATES PATENT AND TRADEMARK OFFICE
CERTIFICATE OF CORRECTION

| | | |
|---|---|---|
| PATENT NO. | : 9,002,736 B2 | |
| APPLICATION NO. | : 14/055641 | |
| DATED | : April 7, 2015 | |
| INVENTOR(S) | : Wohlwend et al. | |

It is certified that error appears in the above-identified patent and that said Letters Patent is hereby corrected as shown below:

In the Specification

Col. 10, line 4, replace "be" with -- being --
Col. 11, line 37, replace "be" with -- being --
Col. 12, line 55, replace "be" with -- being --
Col. 13, line 64, replace "be" with -- being --
Col. 15, line 7, replace "be" with -- being --
Col. 16, line 18, replace "be" with -- being --

In the Claims

Column 19, Claim 17, lines 27-28, delete "can" after "communication"

Signed and Sealed this
Twenty-eighth Day of July, 2015

Michelle K. Lee
*Director of the United States Patent and Trademark Office*